(12) United States Patent
Nasu et al.

(10) Patent No.: US 8,255,076 B2
(45) Date of Patent: Aug. 28, 2012

(54) CAM SYSTEM AND METHOD

(75) Inventors: Masahito Nasu, Fukuoka (JP); Takashi Inoue, Fukuoka (JP); Hiroki Abe, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1122 days.

(21) Appl. No.: 11/824,023

(22) Filed: Jun. 29, 2007

(65) Prior Publication Data

US 2008/0004745 A1 Jan. 3, 2008

(30) Foreign Application Priority Data

Jun. 30, 2006 (JP) ................................ 2006-180818

(51) Int. Cl.
*G06F 19/00* (2011.01)
(52) U.S. Cl. ............................ 700/182; 700/97; 700/98
(58) Field of Classification Search .................. 700/159, 700/173, 182, 184, 97, 98; 345/419, 420, 345/619
See application file for complete search history.

(56) References Cited

U.S. PATENT DOCUMENTS

| | | | | |
|---|---|---|---|---|
| 5,115,400 A * | 5/1992 | Watanabe et al. | ............. | 700/182 |
| 5,388,199 A * | 2/1995 | Kakazu et al. | ................ | 345/420 |
| 5,485,390 A * | 1/1996 | LeClair et al. | ................ | 700/182 |
| 5,815,400 A * | 9/1998 | Hirai et al. | .................... | 700/173 |
| 5,993,042 A * | 11/1999 | Matsubara et al. | ........... | 700/182 |
| 6,363,298 B1 | 3/2002 | Shin et al. | | |
| 6,650,960 B2 * | 11/2003 | Kakino et al. | ................ | 700/173 |
| 6,982,711 B1 * | 1/2006 | Takagi | .......................... | 345/420 |
| 7,006,087 B2 * | 2/2006 | Takagi | .......................... | 345/419 |
| 7,269,471 B2 * | 9/2007 | Kadono | ........................ | 700/159 |
| 7,363,103 B2 * | 4/2008 | Takahashi et al. | ............ | 700/182 |
| 7,392,109 B2 * | 6/2008 | Teramoto et al. | ............. | 700/182 |
| 7,487,005 B2 * | 2/2009 | Kakino et al. | ................ | 700/179 |

FOREIGN PATENT DOCUMENTS

| | | |
|---|---|---|
| DE | 39 21 994 A1 | 1/1990 |
| EP | 0 996 045 A2 | 4/2000 |
| JP | H06-31589 | 2/1994 |
| JP | 10-058280 | 3/1998 |
| JP | 2005-309713 | 11/2005 |

OTHER PUBLICATIONS

Japanese Office Action in corresponding Japanese Patent Application No. 2006-180818 mailed May 24, 2011 (with English translation).

* cited by examiner

*Primary Examiner* — Charles Kasenge
(74) *Attorney, Agent, or Firm* — Greers, Burns & Crain, Ltd.

(57) ABSTRACT

To provide a CAM system and method which can facilitate change of a machining posture and a machining procedure, and can aid an operation of forming an optimum machining path. Machining features capable of being integrated into one are obtained and a machining procedure for the integrated machining feature is obtained. Based on the machining procedure, design data is converted to manufacturing data. The manufacturing data capable of machining the integrated machining feature together can be therefore obtained in contrast with the case of separately machining the individual machining features which constitute the integrated machining feature.

10 Claims, 20 Drawing Sheets

| GEOMETRICAL ELEMENT | MEANING |
|---|---|
| SHELL | ELEMENT FOR SURROUNDING SPACE BY FACES JOINED TO EACH OTHER. SPLID IS REPRESENTED BY BEING SURROUNDED WITH A PLURALITY OF SHELL. |
| FACE | ELEMENT PRESENTING EACH FACE OF SOLID. SHELL IS CONSTITUTED BY A PLURALITY OF CONTINUOUS FACES |
| LOOP | ELEMENT RESENTING CONTOUR OF FACE. FACE IS CONSTITUTED BY ONE LOOP. WHEN FACE HAS HOLE THEREIN, IT IS CONSTITUTED BY A PLURALITY OF LOOPS. |
| EDGE | ELEMENT (LINEAR OR CURVED LINE) REPRESENTING PORTION WHERE TWO FACES INTERSECT. ONE LOOP IS CONSTITUTED BY A PLURALITY OF EDGES. |
| VERTEX | ELEMENT REPRESENTING PORTION WHERE TWO OR MORE EDGES INTERSECT. |

Fig. 4

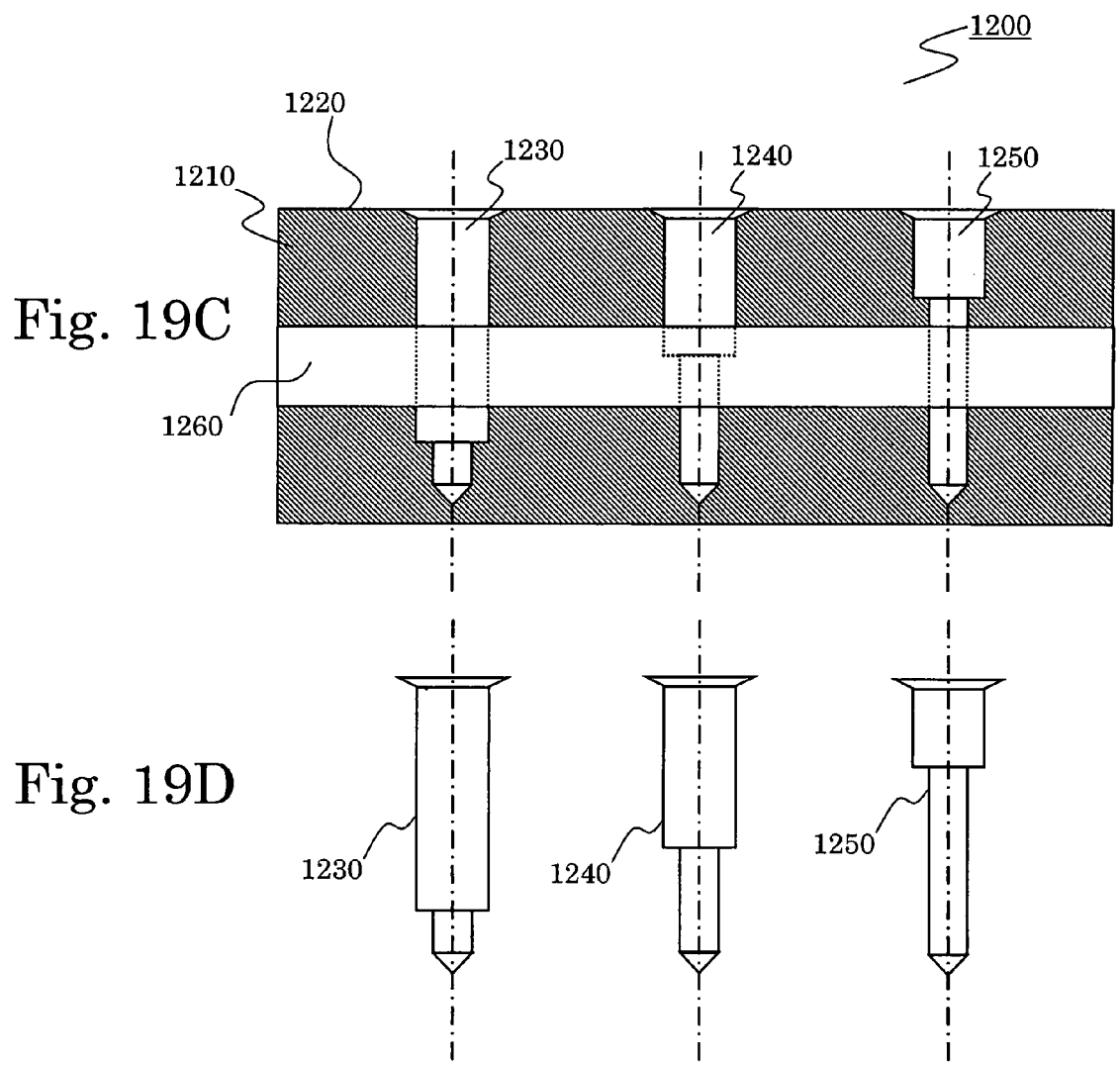

CAM SYSTEM AND METHOD

BACKGROUND OF THE INVENTION

1. Field of the Invention

The present invention relates to a Computer Aided Manufacturing System (CAM) system which aides determining a work-location to be machined and machining steps for manufacturing the work, more particularly, and to CAM and method for machining a plurality of locations to be machined, which are extracted from a three-dimensional CAD model, in optimum postures (setups) and optimum machining steps (machining sequence).

2. Description of the Related Art

A two- or three-dimensional Computer aided design (CAD) and CAM system is utilized in a process of product development from product design to manufacturing. In the process of product development, design of a product is first performed in the design department by using a three-dimensional CAD apparatus through dialog with a designer, whereby a three-dimensional CAD model (product model) representing a product shape is formed. Three-dimensional CAD data prepared in that stage is transferred to a three-dimensional CAM apparatus through an interface based on a universal data exchange format, such as Initial Graphics Exchange Specification (IGES) or Standard for the exchange of product model (STEP). In addition, the designer converts the product shape to two-dimensional drawings (design drawings) by using the three-dimensional CAD apparatus and writes additional information, e.g., dimensions, machining methods such as spot-facing and drilling, and surface roughness, on the two-dimensional drawings.

On the other hand, the three-dimensional CAM apparatus receives the three-dimensional CAD data from the three-dimensional CAD apparatus and enters additional information, such as locations to be machined, machining methods, and surface roughness, into the three-dimensional CAD data through dialog with a manufacturing engineer while referring to the two-dimensional drawings. Further, the three-dimensional CAM apparatus obtains developed data of the product, etc. from the three-dimensional CAD data added with attribute information, such as locations to be machined, machining methods, and surface roughness, calculates a tool/machining path (tool locus data) in an NC working machine based on the developed data, and prepares NC data to perform NC machining.

When the NC data is prepared in such a two- or three-dimensional CAD and CAM system, the manufacturing engineer takes into account machining methods such as drilling, used tools, machining conditions (such as a tool rotating speed), a table moving speed, a cut amount, etc., for each of individual locations to be machined, and sets those items of information for the three-dimensional CAM apparatus through dialog, thereby forming the machining path.

Generally, the machined location in the three-dimensional CAD model formed by utilizing the CAD apparatus includes recognition of in what way what shape is arranged with respect to a basic shape of the three-dimensional CAD model (i.e., a machining shape feature: hereinafter referred to as a "machining feature"). When the three-dimensional CAD data is transferred from the CAD apparatus to the CAM apparatus, the geometrical shape of the product model is transferred to the CAM apparatus. At that time, however, the attribute information of each machining feature is not recognized by the CAM apparatus and is lost. In view of such a problem, some of recent CAM apparatuses capable of handling the three-dimensional CAD data have the function of automatically recognizing the machining feature from the geometrical shape of the product model and automatically selecting proper ones of machining tools and machining conditions which are registered in advance, thereby forming the machining path. Japanese Unexamined Patent Application Publication No. 6-31589 discloses a method of generating NC data that is applicable to operate that type of CAM apparatus.

[Patent Document 1] Japanese Unexamined Patent Application Publication No. 6-31589

When one part is machined, the part usually may have a plurality of or plural kinds of locations to be machined. Machining of those locations to be machined requires setups for setting a plurality of machining postures, change of the machining sequence to avoid useless consumption of a machining time, and re-preparation of the machining feature information.

The known CAM apparatus is able to automatically recognize the machining feature from the geometrical shape of the product model, to identify hole shapes such as a countersink and a counterbore (spot-faced hole), and to decide a machining posture from the center axis or the opening direction of a hole. However, because the actual product shape includes a shape for which the machining posture is not uniquely decided (see FIG. 18), and a special shape for which the machining feature is not uniquely decided (see FIG. 19), the machining posture and the machining feature are finally changed or corrected through dialog in the CAM apparatus at the human's discretion. For that reason, the known CAM apparatus is not yet sufficiently satisfactory in that a new problem arises with the change and disables subsequent processing or forms an erroneous machining path, thus causing an incorrect result.

FIG. 18 shows a cross section in which a simple through hole 1002 is bored in a part 1000. FIG. 18 represents the case where the machining posture is not uniquely decided because there are two kinds of machining directions from above and below (shown by arrows A and B). FIG. 19A represents a cross section of an example 1110 in which a blind hole is divided into three holes 1130, 1140, 1150 at its intermediate portions due to a specific product shape, and FIG. 19C represents a cross section of an example 1210 in which blind holes 1230, 1240, and 1250 are divided by another hole 1260. The blind holes in FIGS. 19A and 19B should be each identified as one blind hole 1180 and 1230-1250 as shown in FIGS. 19B and 19D, respectively, but they are recognized just as holes opened in a reference face in many cases. When the divided hole is recognized as one simple hole, a useless machining time is consumed depending on the machining sequence of the divided holes. For example, when a horizontal hole is first machined in (c), idle machining feed is generated in a space dividing a vertical hole when the vertical hole is machined.

SUMMARY OF THE INVENTION

In view of the above-mentioned state of the art, an object of the present invention is to provide a computer aided manufacturing system (CAM system) and method which can facilitate change of a machining posture and a machining procedure, and can aid an operation of forming an optimum machining path.

The present invention provides a computer aided manufacturing system (CAM system) for converting design data designed by a computer aided design apparatus to manufacturing data used in a working machine for machining a workpiece. The CAM system comprises: means for loading the design data; means for extracting geometrical shapes and attribute information of loaded features; means for obtaining dependence relationships among the features from the extracted geometrical shapes and attribute information of the features; means for obtaining a machining feature, which integrates a plurality of features into one, from the dependence relationships among the features; and means for obtaining a machining procedure for the integrated machining feature, the design data being converted to the manufacturing data for the determined machining procedure.

BRIEF DESCRIPTION OF THE DRAWINGS

FIG. 4 shows geometrical elements which constitute a B-reps solid.

FIG. 6A shows a structure of plane, FIG. 6B shows a structure of cylinder, FIG. 6C shows a structure of conical shape, and FIG. 6D shows a structure of sphere.

FIGS. 19A to 19D show a shape in which a machining feature is not uniquely decided, FIG. 19A shows a cross section of a model, FIG. 19B shows a unique hole, FIG. 19C show a shape in which a machining feature is not uniquely decided, each hole is divided by a hole, and FIG. 19D shows each unique hole shown in FIG. 19C.

DESCRIPTION OF THE PREFERRED EMBODIMENT

The present invention can be practiced in a CAM system, particularly a three-dimensional CAM system, which is used in process design for drilling.

The present invention has following features.

(1) Generation of Data to Realize Collective Machining of Divided Machining Features The CAM system according to the present invention resides in a CAM system for converting design data designed by a CAD apparatus to manufacturing data used in a working machine for machining a workpiece, the CAM system comprising means for loading the design data; means for extracting geometrical shapes and attribute information of loaded features; means for obtaining dependence relationships among the features from the extracted geometrical shapes and attribute information of the features; means for obtaining a machining feature, which integrates a plurality of features into one, from the dependence relationships among the features; and means for obtaining a machining procedure for the integrated machining feature, the design data being converted to the manufacturing data for the determined machining procedure.

Thus, according to the present invention, after obtaining one integrated machining feature and obtaining a machining procedure for the integrated machining feature, the design data is converted to the manufacturing data based on the machining procedure. Therefore, an advantage is provided in that the manufacturing data capable of machining the integrated machining feature together can be obtained in contrast with the case of separately machining the individual machining features which constitute the integrated machining feature. Further, by machining a workpiece with the working machine using the obtained manufacturing data, machining can be realized with a shorter machining time. In some cases, an additional advantage is provided in that a machining shape with a more satisfactory finish is obtained by continuously machining a workpiece which can be machined in a continuous manner.

Figure 13:
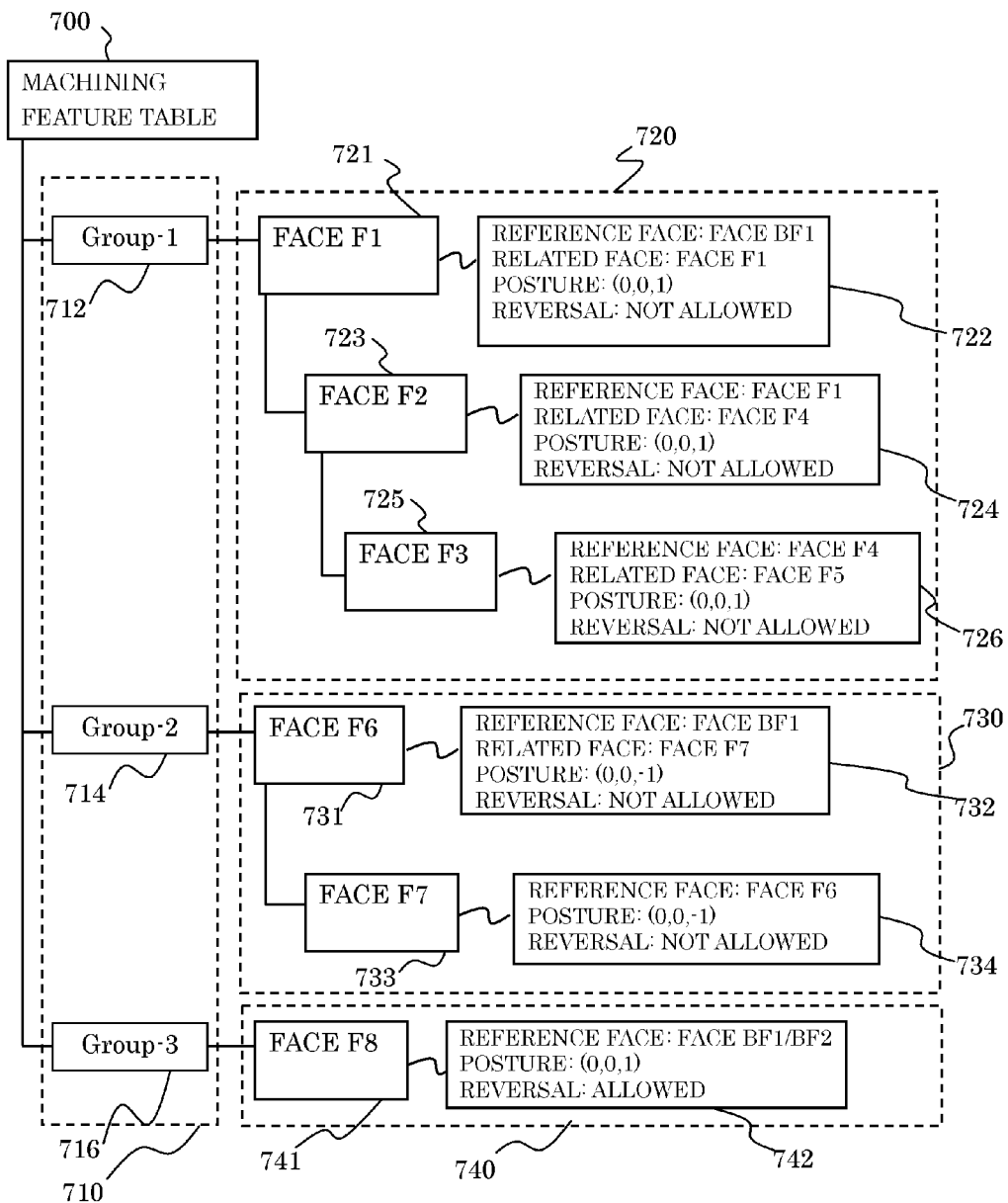
FIG. 13 shows a machining feature table according to the first embodiment of the present invention.
Figure 14:
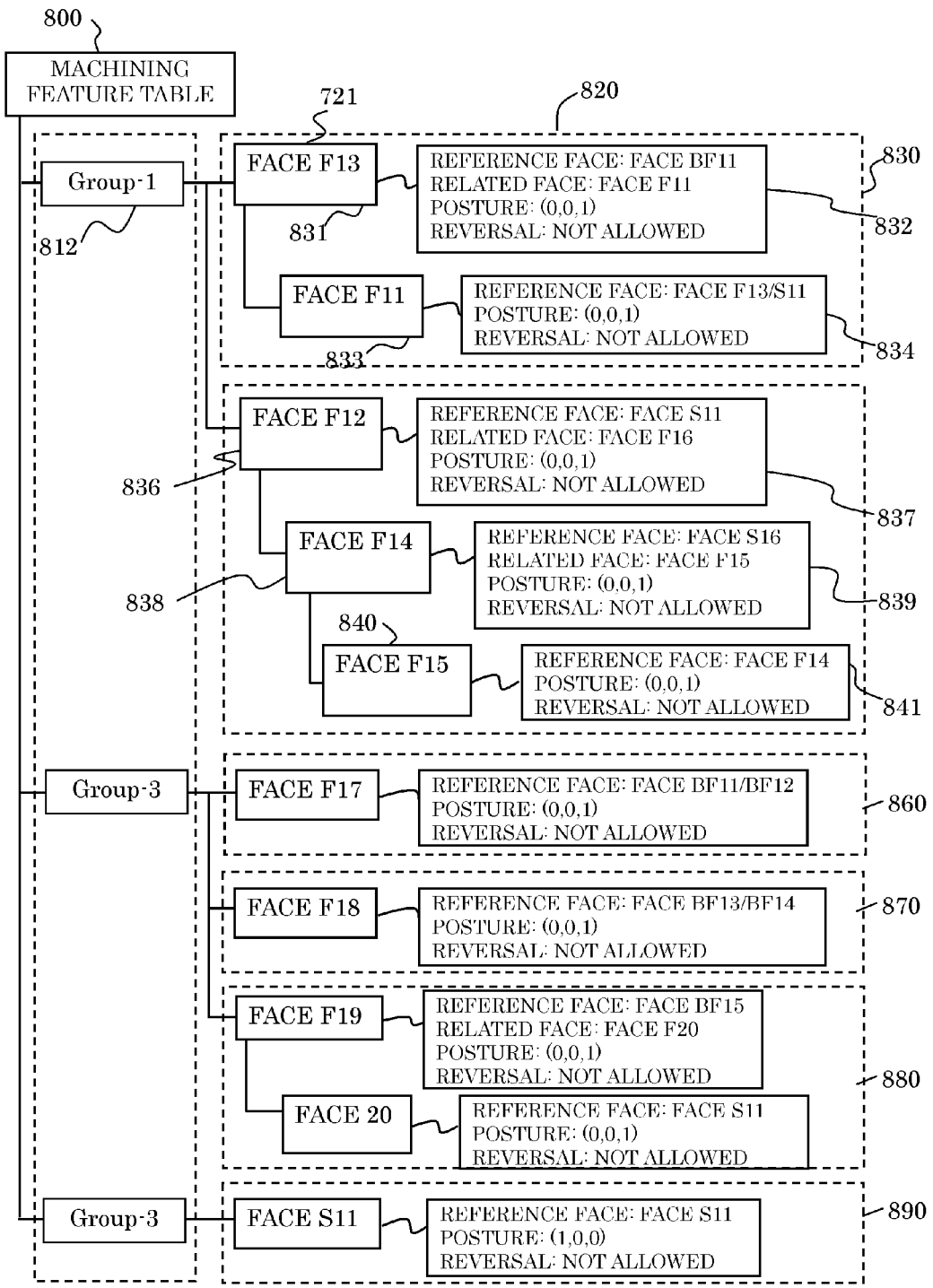
FIG. 14 shows a machining feature table according to the first embodiment of the present invention when a hole is divided.

The wording "integrates a plurality of features into one" is used in the first embodiment, which represents one form of the present invention, as grouping a plurality of features satisfying certain conditions into one machining feature (see FIGS. 13 and 14).

(2) Formation of Preferred Machining Path Based on Comparison of Machining Time

The CAM system according to the present invention further comprises, as required, means for, when a machining area is overlapped between the integrated machining features, calculating respective machining times from the integrated machining features and the corresponding machining procedures, wherein the design data is converted to the manufacturing data for the integrated machining feature and the machining procedure which have a shorter machining time.

Thus, according to the present invention, when the integrated machining features are in a divided relation, the manufacturing data is generated by selecting the machining procedure which provides a shorter machining time. An advantage is therefore obtained in that the manufacturing data enabling the workpiece to be more rapidly machined can be generated.

The term "integrated machining feature" is a concept including the feature before it is divided. When holes are formed in a workpiece at successive positions, those successive holes can be one example of the integrated machining feature. Other conditions, such as the same axis, the same posture and the same radius, can also be added besides the successive relation.

When the machining features and the machining procedure are known, the machining time can be calculated because a feed speed for the machining can be specified based on a usable tool. When a plurality of tools can be used, the machining time may be calculated for a standard tool commonly used, or for each of individual tools. Thus, the machining time can be calculated based on, e.g., the machining features, the machining procedure, the tool used in each step, and the material of a workpiece. A method of calculating the machining time in a system environment to prepare the manufacturing data can be realized with the known and conventional techniques when data for calculating the machining time is known. Therefore, a detailed description of such a method is omitted here.

(3) Generation of Data to Realize Collective Machining of Divided Features

The CAM system according to the present invention resides in a CAM system for converting design data designed by a CAD apparatus to manufacturing data used in a working machine for machining a workpiece, the CAM system comprising means for loading the design data; means for extracting geometrical shapes and attribute information of loaded features; means for obtaining dependence relationships among the features from the extracted geometrical shapes and attribute information of the features; means for determining from the obtained dependence relationships among the features whether one feature is divided by another feature; means for, when the determination results in that one feature is divided by another feature, determining whether the divided feature is machined earlier than the dividing feature in a machining sequence; and means for, when the determination results in that the divided feature is machined earlier than the dividing feature in the machining sequence, generating the manufacturing data for the feature before the divided feature is divided.

(4) Determination as to Whether Machining Posture can be Changed

The CAM system according to the present invention resides in a CAM system for converting design data designed by a CAD apparatus to manufacturing data used in a working machine for machining a workpiece, the CAM system comprising means for loading the design data; means for extracting attribute information of loaded features; means for determining from the extracted attribute information of the features whether change of a machining posture instructed from a user can be accepted; and means for, at least when the change of the machining posture instructed from the user cannot be accepted, issuing an output to notify in a user recognizable manner that the instructed change of the machining posture cannot be accepted.

Thus, according to the present invention, whether the machining posture can be changed is determined, and if it is determined that the machining posture cannot be changed, the determination result is outputted for notification to the user. Therefore, an advantage is obtained in avoiding the machining operation from proceeding to subsequent steps while the machining posture remains in a not-changeable state, and in preventing an accident beforehand which is possibly caused by human error.

The operation of issuing an output to notify in a user recognizable manner that the instructed change of the machining posture cannot be accepted, is performed by well-known and conventional display output techniques such as outputting an error message "the instructed machining posture cannot be changed" (including other similar expressions) to a display, or outputting an error number to the display, or outputting an image which represents the intended matter. The output may be issued in the form of sounds or a print other than the visual output. As an alternative, the system may be designed so as not to reflect the change of the machining posture instructed from the user.

Criteria for determining whether the machining posture can be changed are combinations of features and/or kinds of hole depth. The kinds of hole depth include a through hole and a blind hole. In the embodiment, the combinations of features are set, for example, such that when a conical face becomes a reference face and a related face, reversal of the feature is set to be not allowed, and when a conical face becomes a reference face and a reference face, reversal of the feature is set to be allowed.

(5) Display of Changeable Machining Posture and Acceptance of Change of Machining Posture The CAM system according to the present invention resides in a CAM system for converting design data designed by a CAD apparatus to manufacturing data used in a working machine for machining a workpiece, the CAM system comprising means for loading the design data; means for extracting geometrical shapes and attribute information of loaded features; means for obtaining dependence relationships among the features from the extracted geometrical shapes and attribute information of the features; means for determining from the extracted attribute information of the features whether a machining posture can be changed; and means for displaying in a user viewable manner the dependence relationships among the features and a situation as to whether the machining posture can be changed.

Thus, according to the present invention, not only the dependence relationships among the features are displayed, but also the situation as to whether the machining posture can be changed is displayed based on the dependence relationships. An advantage is therefore obtained in that the user can be kept from instructing erroneous change of the machining posture.

From the above description, it is apparent to those skilled in the art that the inventions set forth in above (1) through (5) can be each practiced as an apparatus (CAM apparatus), a program (including a program for constructing the CAM apparatus and a program for executing a process to generate the manufacturing data), and a method (method of generating the manufacturing data).

(6) Generation of Data To Realize Collective Machining of Divided Features (Method)

The CAM system according to the present invention resides in a manufacturing data generating method executed by a computer for converting design data designed by a CAD apparatus to manufacturing data used in a working machine for machining a workpiece, the method comprising a step of loading the design data; a step of extracting geometrical shapes and attribute information of loaded features; a step of obtaining dependence relationships among the features from the extracted geometrical shapes and attribute information of the features; a step of determining from the obtained dependence relationships among the features whether one feature is divided by another feature; a step of, when the determination results in that one feature is divided into a plurality of features, determining whether the divided feature is machined earlier than the dividing feature in a machining sequence; and a step of, when the determination results in that the divided feature is machined earlier than the dividing feature in the machining sequence, generating the manufacturing data for the feature before the divided feature is divided.

Those steps are each executed by the computer including a processor. The computer includes not only a universal computer such as a personal computer, but also electronic computing machines in wide category. Of course, a computer manufactured for a special dedicated use is also included. Practical examples of hardware of the computer include a CPU (Central Processing Unit), a main memory such as a DRAM (Dynamic Random Access Memory), a HD (hard disk) as an external storage device, a keyboard and a mouse which serve as an input device, a LAN card as an expansion card for connection to a network, and a CD-ROM drive. A CAD/CAM system is constructed in the computer having such a hardware configuration. NC data outputted from the CAD/CAM system is transferred to an NC working machine through a network or a data storage medium (such as a Floppy Disk (registered trade mark) or a CD-R) so that a workpiece is machined in accordance with the NC data.

The design data includes two-dimensional CAD data and three-dimensional CAD data.

The manufacturing data includes NC data.

Thus, according to the present invention, when, after obtaining the dependence relationships among the features, it is determined that one feature is divided by another feature and that the divided feature is machined earlier than the dividing feature, the manufacturing data is generated for the feature before the divided feature is divided. An advantage is therefore obtained in that, by machining a workpiece using the generated manufacturing data, the machining can be performed at a stroke on the feature before it is divided, and the workpiece can be machined with higher efficiency.

When the divided feature has an overlapping machined portion between the not-yet-divided feature and the dividing feature, the manufacturing data is preferably generated such that a machining feed is not performed in the overlapping machined portion when the dividing feature is machined. The reason is that, because the machining of the overlapping machined portion is completed at the same time as when the divided feature is machined, total machining can be completed in a shorter time corresponding to omission of the machining feed in the overlapping machined portion.

(7) Generation of Data to Realize Collective Machining of Divided Features (Method)

The CAM system according to the present invention resides in a manufacturing data generating method executed by a computer for converting design data designed by a CAD apparatus to manufacturing data used in a working machine for machining a workpiece, the method comprising a step of loading the design data; a step of extracting geometrical shapes and attribute information of loaded features; a step of obtaining dependence relationships among the features from the extracted geometrical shapes and attribute information of the features; a step of determining from the obtained dependence relationships among the features whether one feature is divided by another feature; a step of, when based on the obtained dependence relationships among the features the determination results in that one feature is divided by another feature, determining whether the divided feature is machined later than the dividing feature in a machining sequence; and a step of, when the determination results in that the divided feature is machined later than the dividing feature in the machining sequence, generating the manufacturing data for the divided feature.

When the not-yet-divided feature has an overlapping machined portion between the divided feature and the dividing feature, the manufacturing data is preferably generated such that a machining feed is not performed in the overlapping machined portion when the divided feature is machined. The reason is that, because the machining of the overlapping machined portion is completed at the same time as when the dividing feature is machined, total machining can be completed in a shorter time corresponding to omission of the machining feed in the overlapping machined portion.

(8) Display of Changeable Machining Posture and Acceptance of Change of Machining Posture The CAM system according to the present invention resides in a manufacturing data generating method executed by a computer for converting design data designed by a CAD apparatus to manufacturing data used in a working machine for machining a workpiece, the method comprising a step of loading the design data; a step of extracting geometrical shapes and attribute information of loaded features; a step of obtaining dependence relationships among the features from the extracted geometrical shapes and attribute information of the features; a step of determining from the extracted attribute information of the machining features whether a machining posture can be changed; a step of displaying in a user viewable manner the dependence relationships among the features and a situation as to whether the machining posture can be changed; and a step of, when change of the changeable machining posture is instructed from a user through input means, automatically updating the attribute information of one or more features affected by the change of the machining posture.

Thus, according to the present invention, since the user can visually confirm the dependence relationships among the features and the situation as to whether the machining posture can be changed, the user can be kept from instructing erroneous change of the machining posture. In addition, since the attribute information of one or more features affected by the change of the machining posture is automatically updated when the change of the changeable machining posture is instructed from the user, an advantage is obtained in that the instruction from the user can be properly accepted and the manufacturing data can be correctly generated.

The foregoing summary of the present invention should not be construed as listing up all features essential in the present invention, and sub-combinations of plural ones of the above-described features are also involved in the scope of the invention.

As described above, the present invention has the advantage that erroneous change and omission in correction of attributes can be avoided in the proceedings of review of the machining posture (setup) in a stage of machining process design. Another advantage is that because, in the proceedings of review of the machining steps (machining sequence), the system automatically selects an optimum machining feature depending on the machining sequence changed by a user, re-definition of the machining feature is not required and the optimum machining path with a shorter machining time can be easily formed.

First Embodiment of Present Invention

One embodiment of the present invention will be described below with reference to the drawings.

Figure 1:
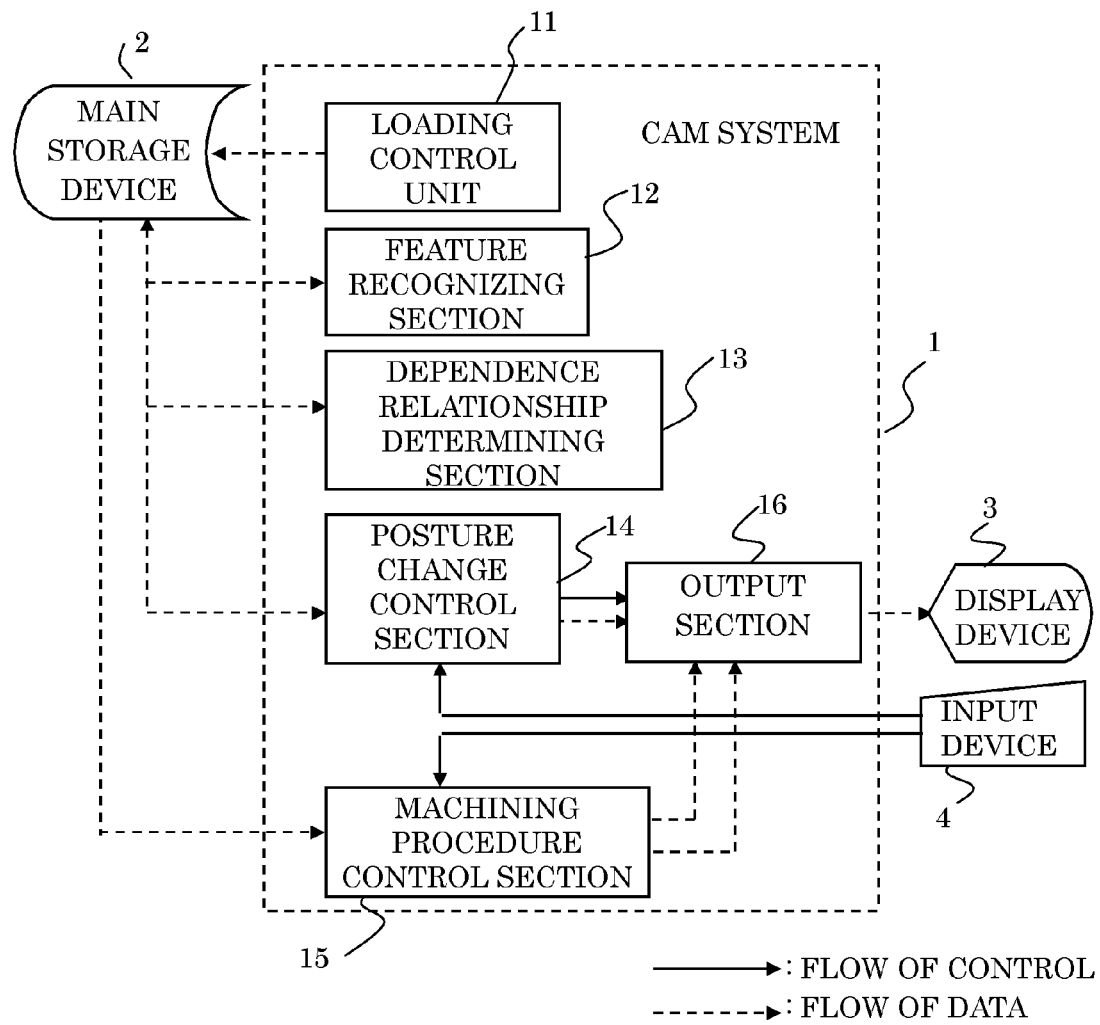
FIG. 1 is a schematic block diagram of a system configuration of a CAM system according to a first embodiment of the present invention.

FIG. 1 is a schematic block diagram of a system configuration of a CAM system. A CAM system 1 of this embodiment comprises a feature recognizing section 12 for extracting the geometrical shape and attribute information of each feature, a dependence relationship determining section 13 for determining the dependence relationships among the extracted features, a posture change control section 14 for determining based on the attribute information of the machining feature whether a machining posture can be changed and controlling the change of the machining posture, a machining procedure control section 15 for controlling the machining procedure in accordance with the dependence relationships among the features, a loading control section 11 for loading three-dimensional CAD data of a product model, and an output section 16 for outputting information of a model to an output device based on the loaded data. Note that the illustrated block diagram of the system configuration shows one example of the present invention and, as will be apparent to those skilled in the art, other suitable block configuration can also be used without departing from the technical scope of the present invention.

Figure 2:
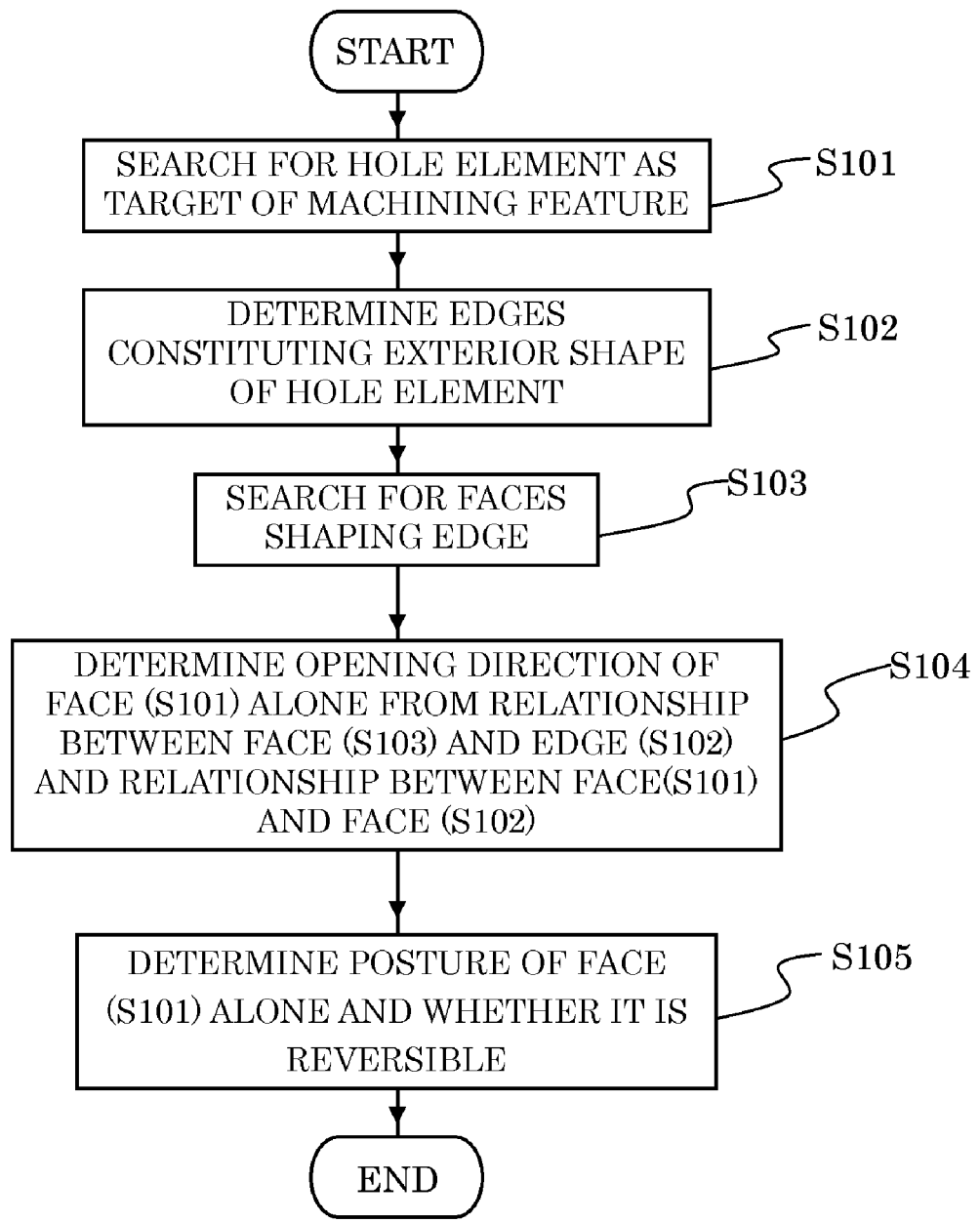
FIG. 2 is an operation flowchart (outline) of a feature recognizing section according to the first embodiment of the present invention.

Referring to FIG. 2, the processing of the feature recognizing section 12 is explained. A search is made for a hole element which becomes a target of the machining feature (i.e., a group of hole elements each capable of being used as one unit of hole) (see S101). Edges (exterior loops) constituting an exterior shape are determined (S102) from the searched hole element searched in S101. Faces to which are connected the hole element are determined by searching for faces sharing each of the edges searched in S102 (S103). An opening direction of the face searched in S101 alone is determined in S104 from the relationship between the face searched in S103 and the edge searched in S102 (i.e., whether the edge constitutes the exterior shape or the hole), the relationship in geometrical shape between the face searched S101 and the face searched in S102, and the relationship in diameter between the face searched in S101 and the face searched in S102. Then, the posture of the face and whether the face is reversible are determined in S105.

Figure 3:
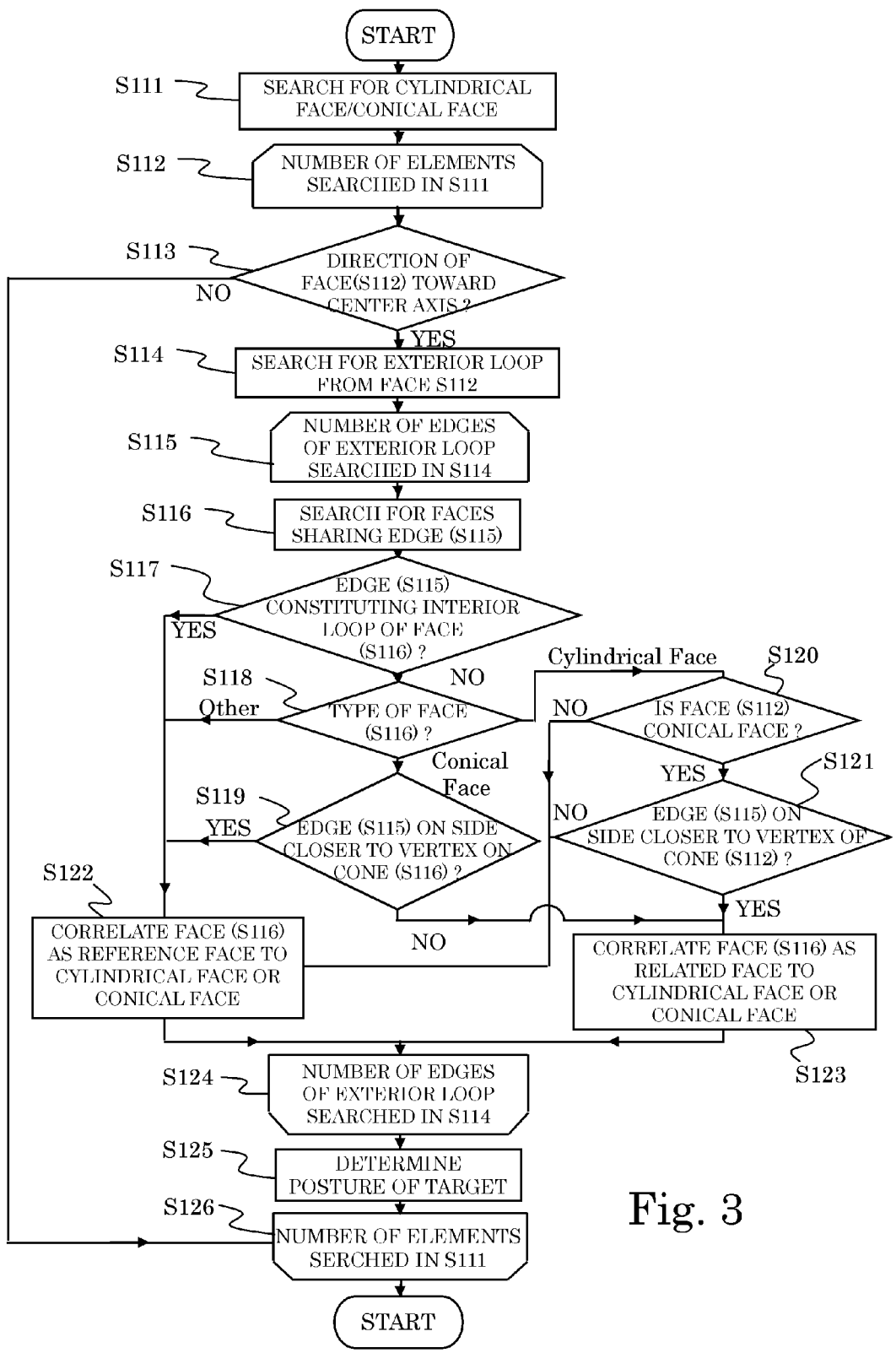
FIG. 3 is an operation flowchart of the feature recognizing section according to the first embodiment of the present invention.

Referring to FIG. 3, more details are explained specifically. All of cylindrical faces and conical faces are searched for from the three-dimensional data (S111). For all of the searched faces, whether the direction of each face is toward a center axis is checked (S113) to determine whether the face constitutes a hole or not (a hole or a projection). For the face (Face-1) which has been determined to constitute a hole, an exterior loop representing the exterior shape of the relevant face is searched for (S114). By utilizing an edge (Edge-1) that constitutes the exterior loop, the direction of the hole and the connection relationship thereof are determined as follows.

A face (Face-2) other than (Face-1) is first obtained from among faces sharing the edge (Edge-1). If the edge (Edge-1) constitutes an interior loop representing an interior edge of the face (Face-2) (S117), attribute data of the face (Face-1) is set with the face (Face-2) being a reference face that represents the opening direction of the hole. If the edge (Edge-1) does not constitute the interior loop of the face (Face-2) (S117), the opening direction is determined from the magnitude of a radius of the geometrical shape of the face (Face-2) or the face (Face-1) (S118) (S119) (S120) and (S121). If the face (Face-2) represents the opening direction, the attribute data of the face (Face-1) is set (S122) with the face (Face-2) being a reference face, and if the face (Face-2) does not represent the opening direction, the attribute data of the face (Face-1) is set (S123) with the face (Face-2) being a related face. This embodiment has been described in connection with one example of techniques for determining which face becomes a reference face or a related face with respect to a target face. However, the technique for determining the reference face or the related face may differ depending on the CAD system and the environment of the CAD system, etc. Further, a plurality of techniques can be used even in the same environment.

In the processing (S115-S124) for all the edges constituting the exterior loop, a face element (reference face) representing the opening direction and a face element (related element) on the opposite side are set as the attribute data of the face (Face-1) searched in (S116). In (S115), the posture of the face (Face-1) as a minimum feature and whether the face (Face-1) is reversible are set from the attribute data thereof. On that occasion, the direction toward the reference face from the related face is set as the posture of the face (Face-1) and the reversal is set to be not allowed. When only the reference face exists (in the case of a conical face), the direction of a cone axis vector is set as the posture and the reversal is set to be not allowed. Further, when a plurality of reference faces exist, the direction of a cylinder axis vector is set as the posture and the reversal is set to be allowed.

The method of determining the geometrical shape in the embodiment described above is based on B-reps (Boundary Representation) that is a general solid model representation method. However, basic outline of the processing is the same even when another representation method is used.

Figure 5:
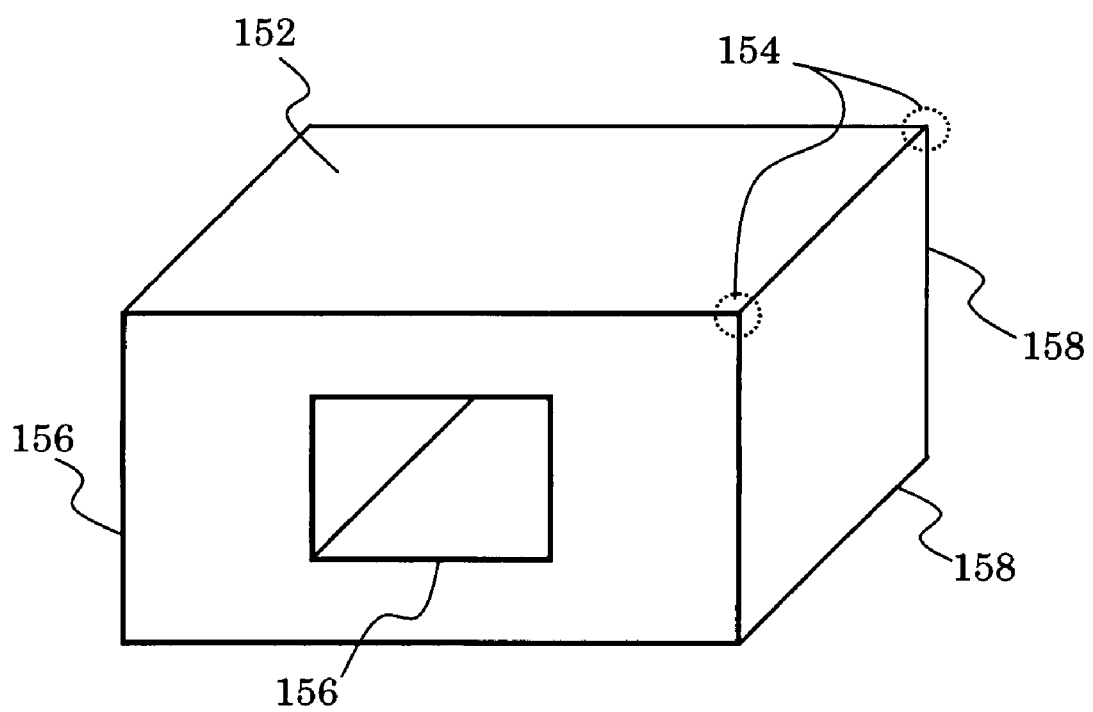
FIG. 5 shows a B-reps phase structure.
Figure 6A:
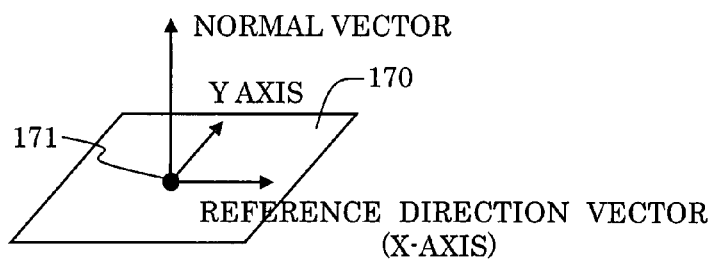
FIGS. 6A to 6D show face partial data structures.
Figure 6B:
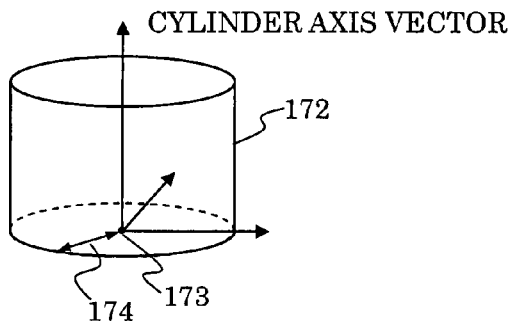
Figure 6C:
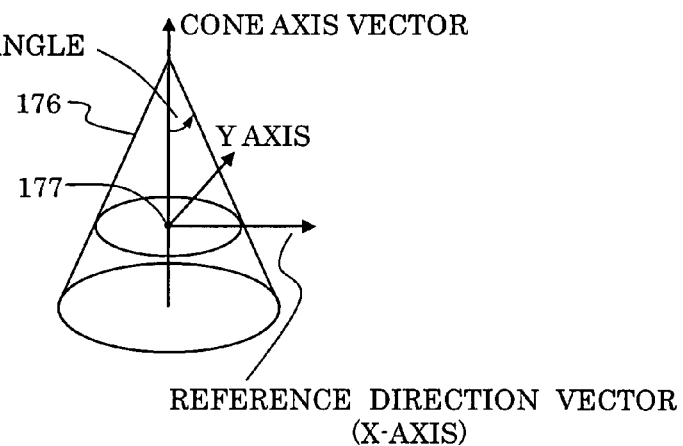
Figure 6D:
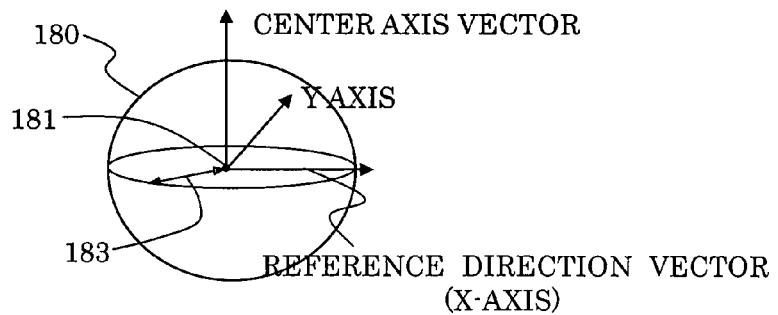

B-reps means a method of representing a solid with boundary faces (each containing information indicating on which side of the face the substantial is included), which constitute the solid. A B-reps solid is constituted by phase elements (Topology) and geometrical elements (Geometry). In FIG. 4, geometrical elements such as shell 132 and the relevant meaning 133 are shown as elements constituting the B-reps. FIG. 5 shows the phase elements which represent how figure elements, such as vertexes 154, edges 158, a loop 156 and a face 152, are interconnected. The geometrical elements represent what kinds of geometrical shapes are given by various elements, such as a face, a line and a point (i.e., they represent coordinate values of each vertex and an equation of each face). FIGS. 6A to 6D shows face data structures. FIG. 6A shows the data structure of a plane 170. The point 171 is the origin for the reference direction vector (X-axis), Y-axis, and the normal vector. FIG. 6B shows a cylinder 172 having the origin 173, a radius 174, a cylinder axis vector, X and Y axes. FIG. 6C shows the data structure of cone 176, having a cone axis vector from the origin 177 (center of base 179) to the vertex, the reference direction vector as X axis and Y axis. The angle between the cone axis vector (Z axis) to the slant is a half-vertex angle. FIG. 6D shows the data structure of sphere 180, where the center of the sphere 180 has the origin 181, the reference direction vector (X axis), Y axis, and the center axis vector, and the radius 183. The center of base (the origin) is the cone axis.

Figure 7A:
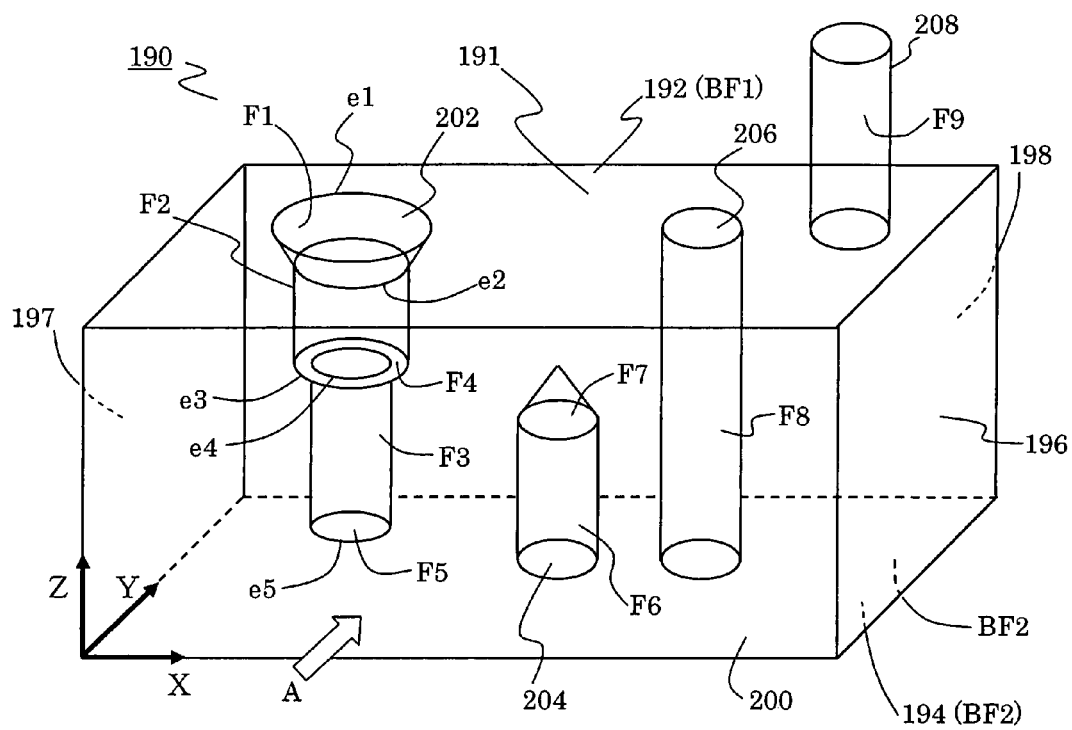
FIG. 7A is an explanatory view for explaining a three-dimensional model and FIG. 7B is a cross section of the model viewing from an arrow in FIG. 7A according to the first embodiment of the present invention.
Figure 7B:
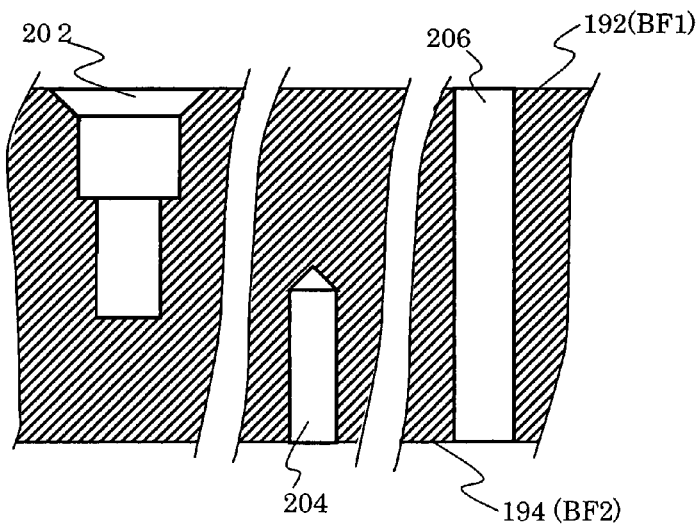
Figure 8:
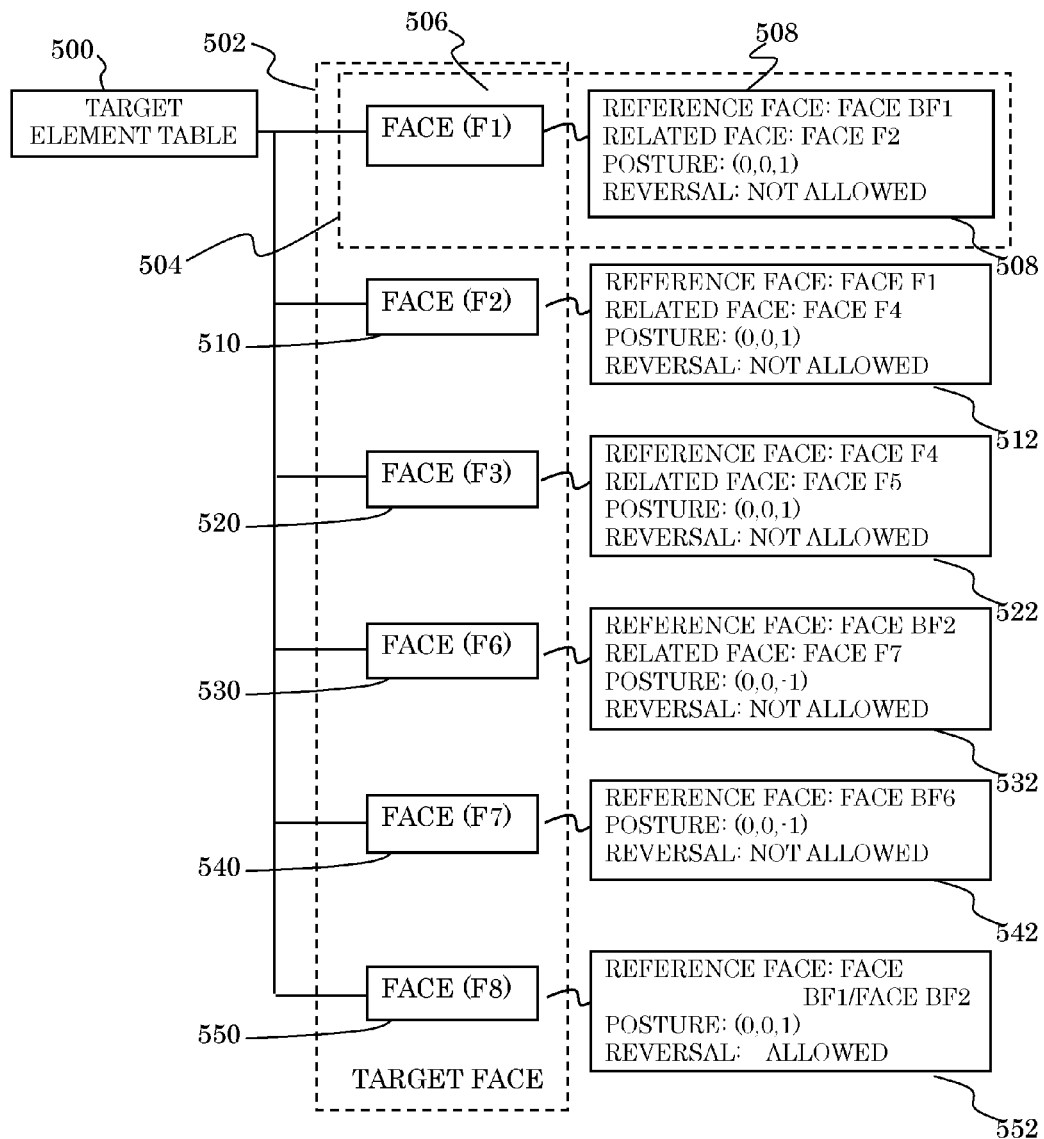
FIG. 8 shows a target element table according to the first embodiment of the present invention.

FIG. 7 shows a three-dimensional model 190 for explaining the operation flowchart of the feature recognizing section 12. A block having faces 192, 194, 196, 198, and 200 is processed into the model 190 which includes holes 202, 204, and 206, and cylindrical projection 208. FIG. 7B shows a cross section viewing the model 190 from the direction indicated an arrow A in FIG. 7A. As shown in FIG. 7B, the holes 202 and 204 are blind holes and the hole 206 is a through hole. As shown in FIG. 7A, the hole 202 comprises conic surface F1, cylindrical faces F2 and F3 of which radiuses are different each other, a face F4 (a plane like a ring) is constituted by the difference between radiuses of F2 and F3, a cylindrical face F3, and F5 (a bottom of the hole 202). The face 192 and the conic surface F1 meet at the edge e1. The conic surface F1 also meets the cylindrical face F2 at the edge e2, and the F2 meets the face F4 at the edge e3. The cylindrical face F3 meets the faces F4 and F4 at the edges e4 and e5 respectively. As explained above, the faces and edges concerning to holes 204 and 206, and the projection 208 are defined as well as on the hole 202. When the illustrated model 190 is processed by the feature recognizing section 12, a target element table 500 shown in FIG. 8 is formed. The target element table 500 shows the target face and the relative information such as the reference face, related face, posture and being reversal or not. For example, a conical face F1 represents an opening of a hole, the face 192 (BF1) as one surface of a workpiece represents a reference face, and the cylindrical face F2 joined to the other side of the conical face F1 represents a related face. The combination, for example, of Face (F1) and the relative information 508 constitutes the minimum feature.

Figure 9:
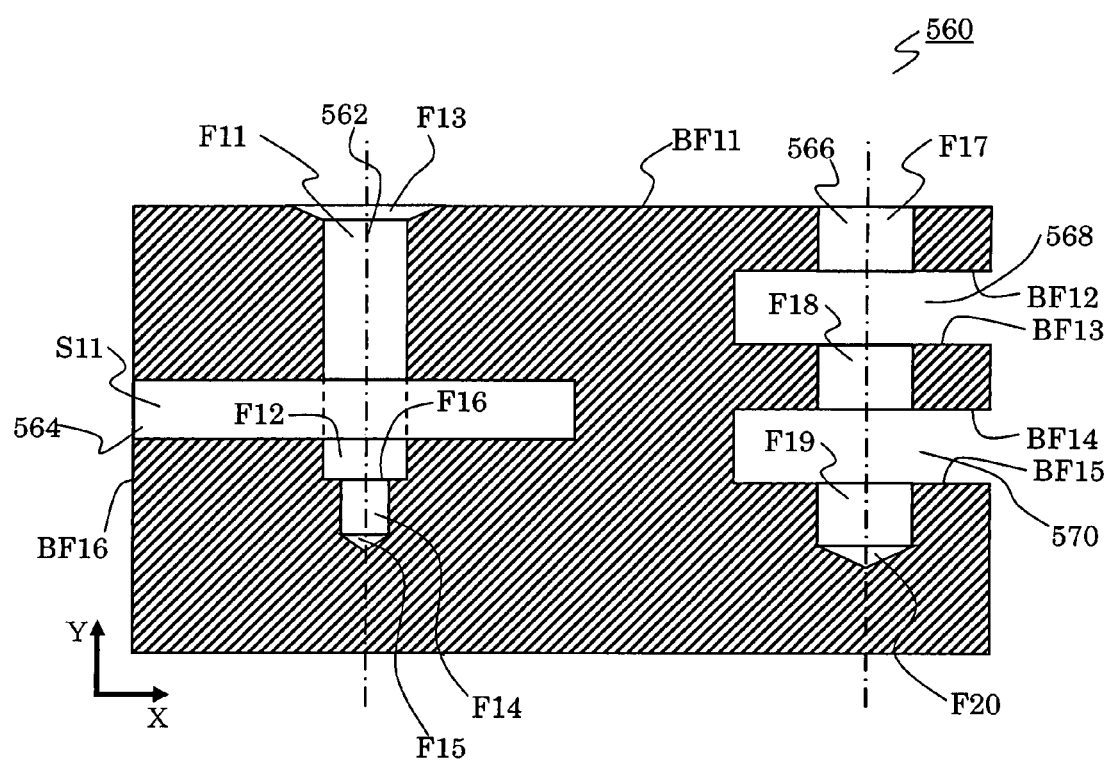
FIG. 9 is an explanatory cross section for explaining a divided machining feature according to the first embodiment of the present invention.
Figure 10:
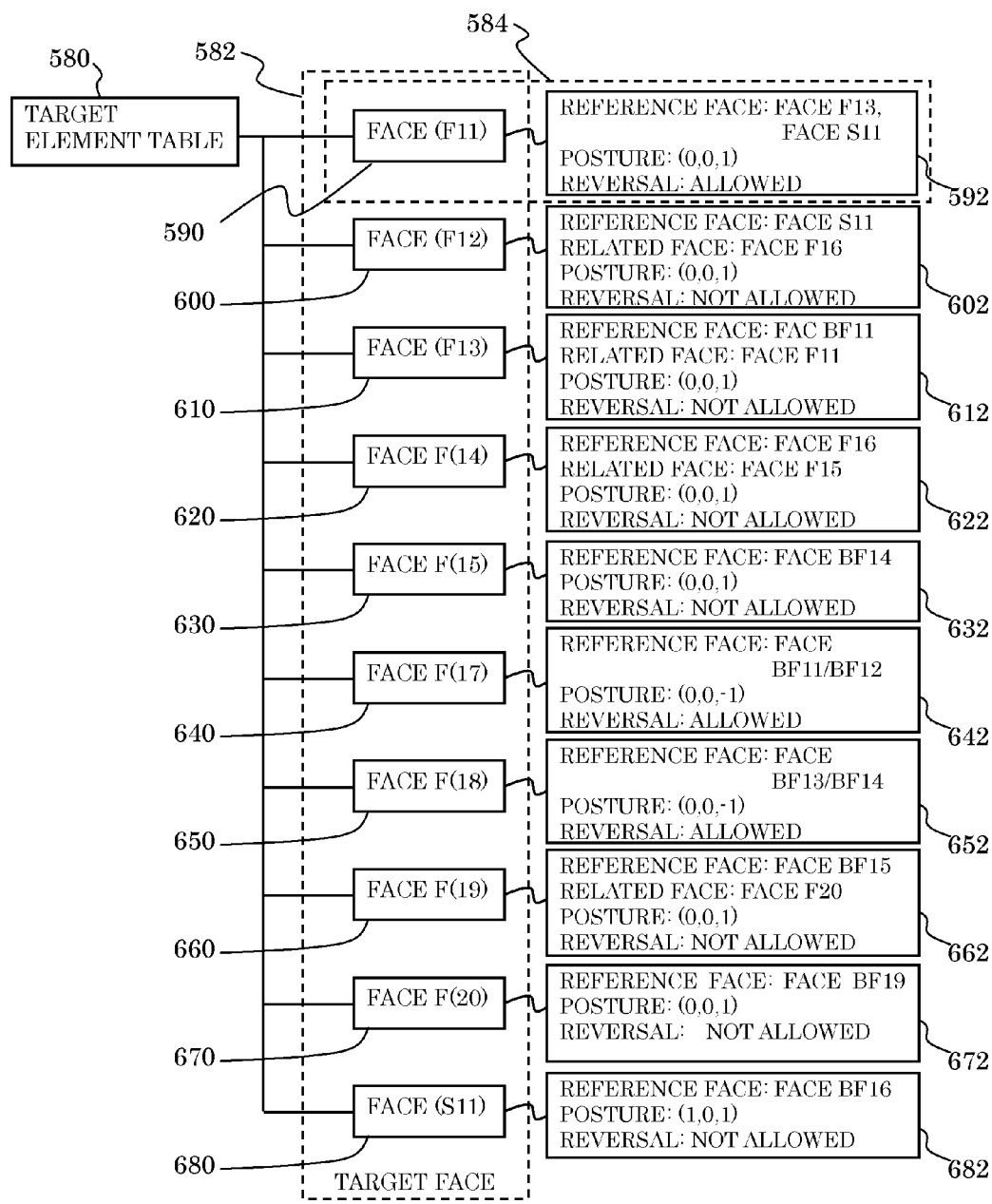
FIG. 10 shows a target element table according to the first embodiment of the present invention when a hole is divided.

FIGS. 9 and 10 are explanatory views for explaining the operation flowchart of the feature recognizing section 12 when a hole is divided. A machining-feature target element table 580 shown in FIG. 10 is formed by the feature recognizing section 12. More particularly, FIG. 9 shows a part 560 in which a blind hole 562 is divided by a hole 564, and a hole 566 is divided by slits 568 and 570. Each faces are denoted in a same manner as shown in FIG. 7A. In the dependence relationship determining section 13, the dependence relationship among the minimum features is determined by using the target element table 580 shown in FIG. 10 as input data, to thereby form a machining feature table that manages a unit handled as the machining feature, the machining posture, etc. In FIG. 10, the minimum feature 592 is shown representatively.

Figure 11:
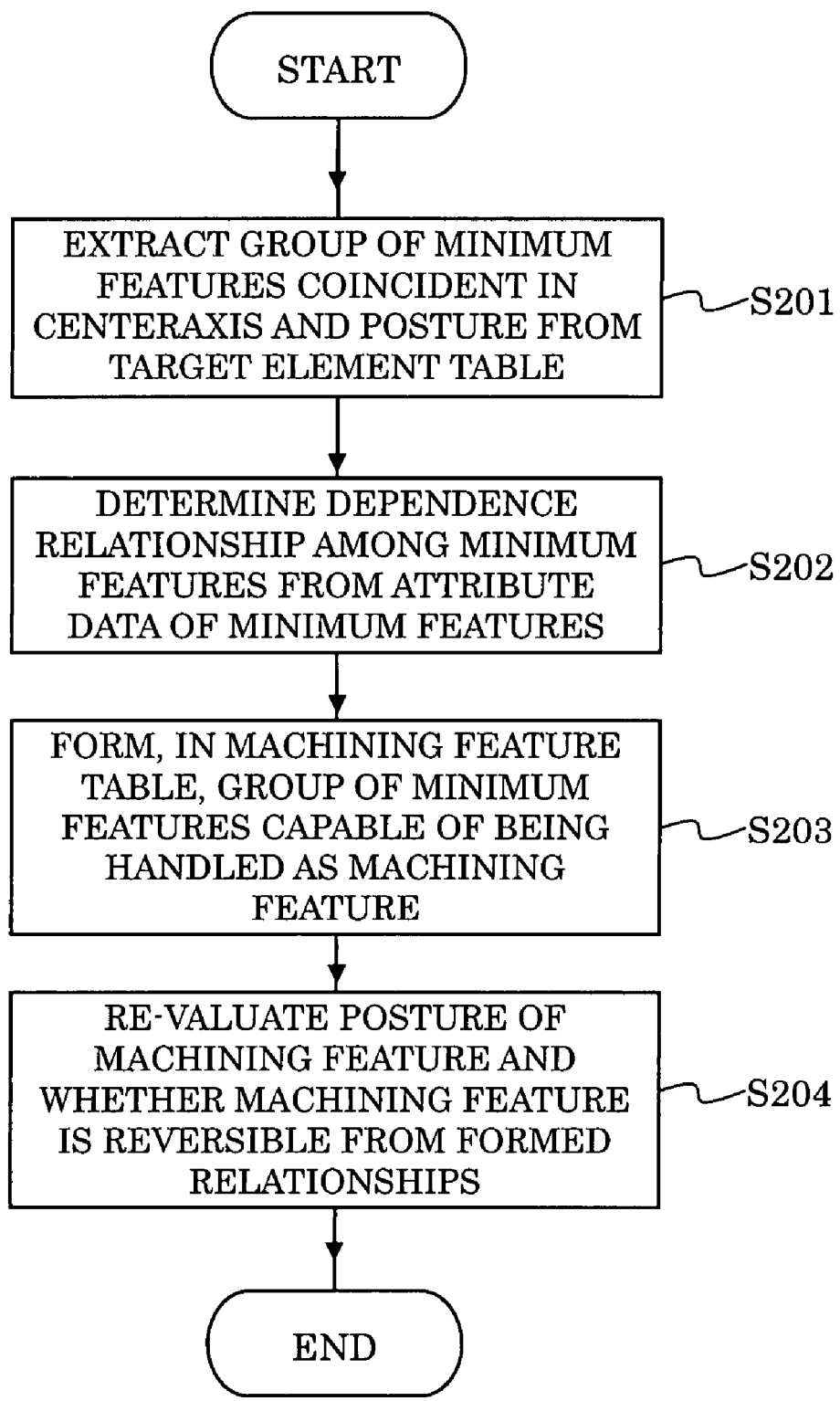
FIG. 11 is an operation flowchart (outline) of a dependence relationship determining section according to the first embodiment of the present invention.

In the dependence relationship determining section 13, a group of minimum features coincident in both the center axis and the posture with each other are extracted from the target element table (see S201 in FIG. 11). The dependence relationships among the minimum features are determined from the attribute data of the minimum features (S202). Based on the determined dependence relationships, a group of minimum features capable of being handled as the machining feature is formed in the machining feature table (S203). The posture of the machining feature and whether the machining feature is reversible are re-evaluated from the formed relationships (S204).

Figure 12:
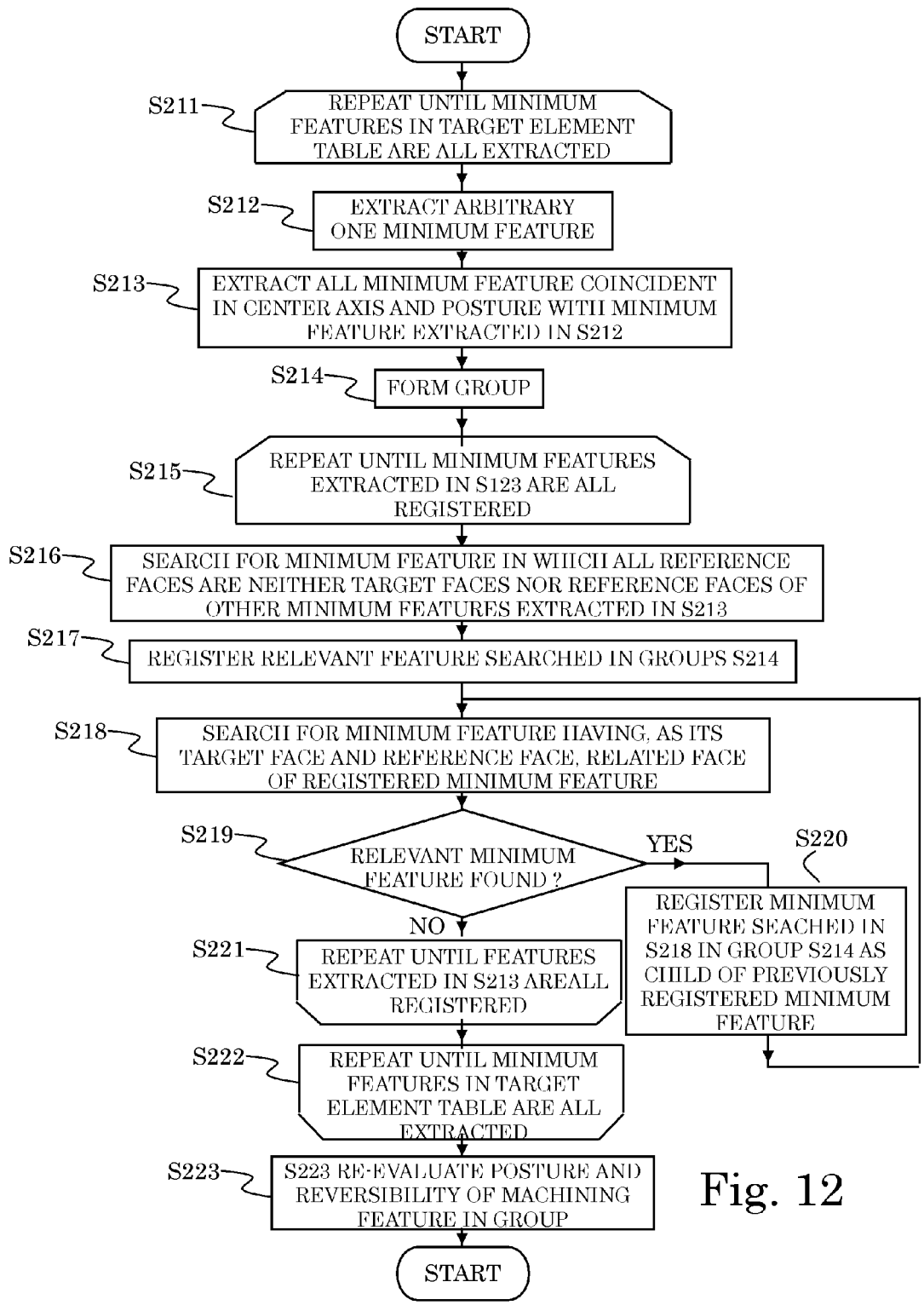
FIG. 12 is an operation flowchart of the dependence relationship determining section according to the first embodiment of the present invention.

FIG. 12 is an operation flowchart of the dependence relationship determining section. The target element table formed by the feature recognizing section 12) is used as input data. FIG. 13 shows the machining feature table formed by the dependence relationship determining section 13). A first layer of the machining feature table contains a group set to manage a machining feature group in which the machining features can be handled as one mass. The machining features belonging to that group takes the same machining posture. The second and subsequent layers each manage one or more minimum features constituting the machining features which can be handled as one mass. The minimum feature at the uppermost level represents the opening portion of the hole.

One arbitrary minimum feature (Feat-1) is extracted from the target element table (S212), and minimum features coincident in the center axis and the posture with the extracted minimum feature (Feat-1) are all extracted from the target element table (S213). The determination on the coincidence of the posture is made by referring to the attribute data of the minimum feature regarding the posture and the reversal. When the reversal is not allowed, the minimum feature having a vector, which is held as its posture and is coincident with that of (Feat-1), is searched for, and when the reversal is allowed, the minimum feature having a vector, which is held as its posture and is coincident with that of (Feat-1) or reversal to that of (Feat-1), is searched for.

A groups set to manage the minimum feature group is formed in the machining feature table (S214). After determining the relationships among the minimum features, the minimum features extracted in (S212) and (S213) are all registered in the group. The process of determining the relationships among the minimum features is performed by searching for (S216) a minimum feature (Feat-2), in which all reference faces in the attribute data thereof are neither the target faces nor the related faces of the other minimum features, from among the minimum features extracted in (S212) and (S213), and by registering (S217) the minimum feature (Feat-2) just subordinate in the formed group. The minimum feature (Feat-2) searched herein becomes the minimum feature that is positioned in the opening direction of the machining feature. Then, a minimum feature (Feat-3) is searched for (S218), i.e., another minimum feature (in the minimum feature group extracted in (S212) and (S213) (except for that already registered in the group)) which has, as its target face and reference face, a related face in the attribute data of the registered minimum feature (Feat-2). If the relevant minimum feature is found (S219), the searched minimum feature (Feat-3) is registered (S220) as a child of the previously registered minimum feature (Feat-2). Further, still another related minimum feature is searched for (S218) from the registered minimum feature (Feat-3). If the relevant minimum feature is not found (S219), the processing is repeated from (S216) until the minimum feature group extracted in (S212) and (S213) is all registered.

Machining feature tables shown in FIGS. 13 and 14 are formed by the dependence relationship determining section 13 from the models shown in FIGS. 7 and 9, respectively. More particularly, in FIGS. 13 and 14, reference numerals 720, 730, 740, 830, 850, 860, 870, 880, and 890 show machining features.

Figure 15:
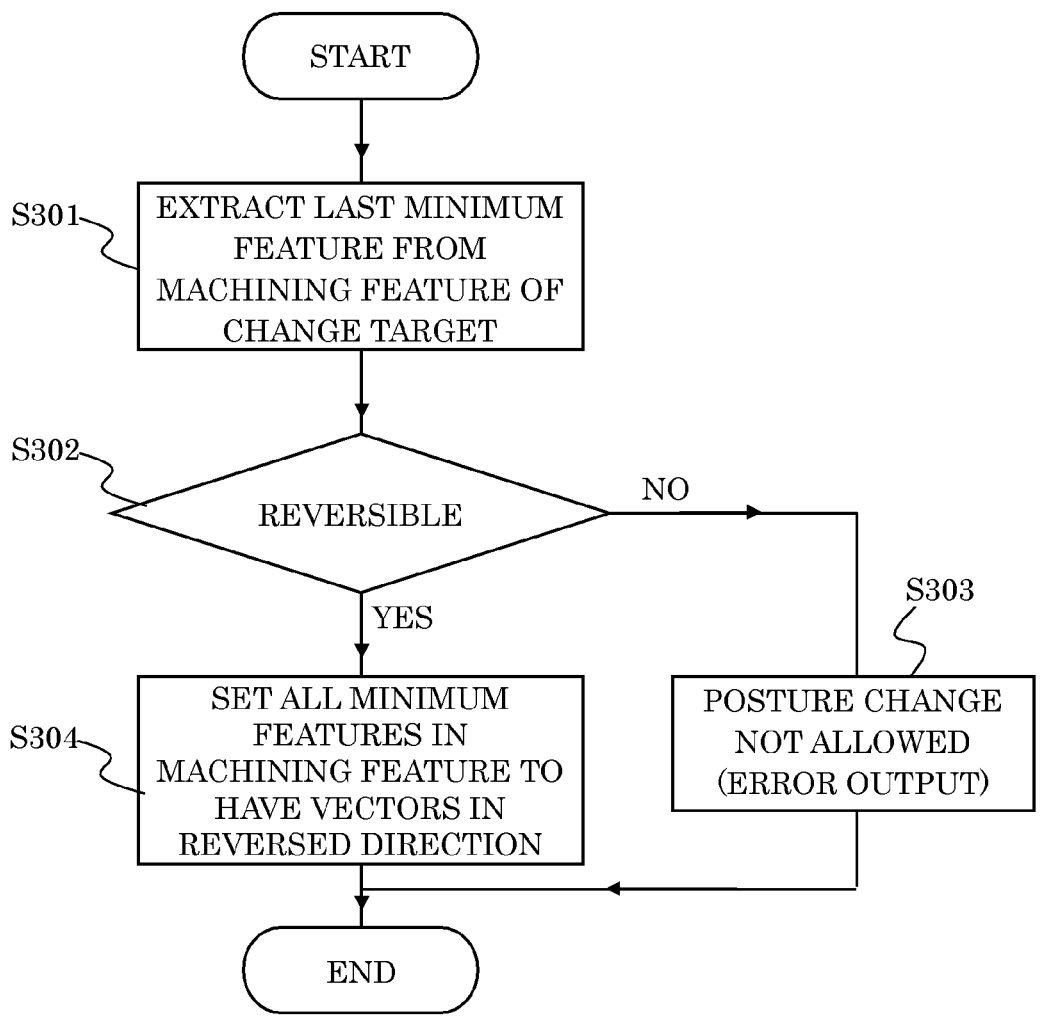
FIG. 15 is an operation flowchart of a posture change control section according to the first embodiment of the present invention when it determines whether a posture can be changed.

FIG. 15 is an operation flowchart of the posture change control section when the machining posture is changed. When the user selects the machining feature of a change target, a reference is made to the item "reversal" in the attribute data held by the last minimum feature in the machining feature (S301). If the reversal is allowed (S302), the posture attribute data of all the minimum features in the group to which belongs the designated machining feature are changed to have vectors in the reversed direction (S304). If the reversal of the attribute data is not allowed (S302), this means that the designated machining feature cannot be changed in posture. Therefore, an error output or other suitable action is performed (S303).

Figure 16:
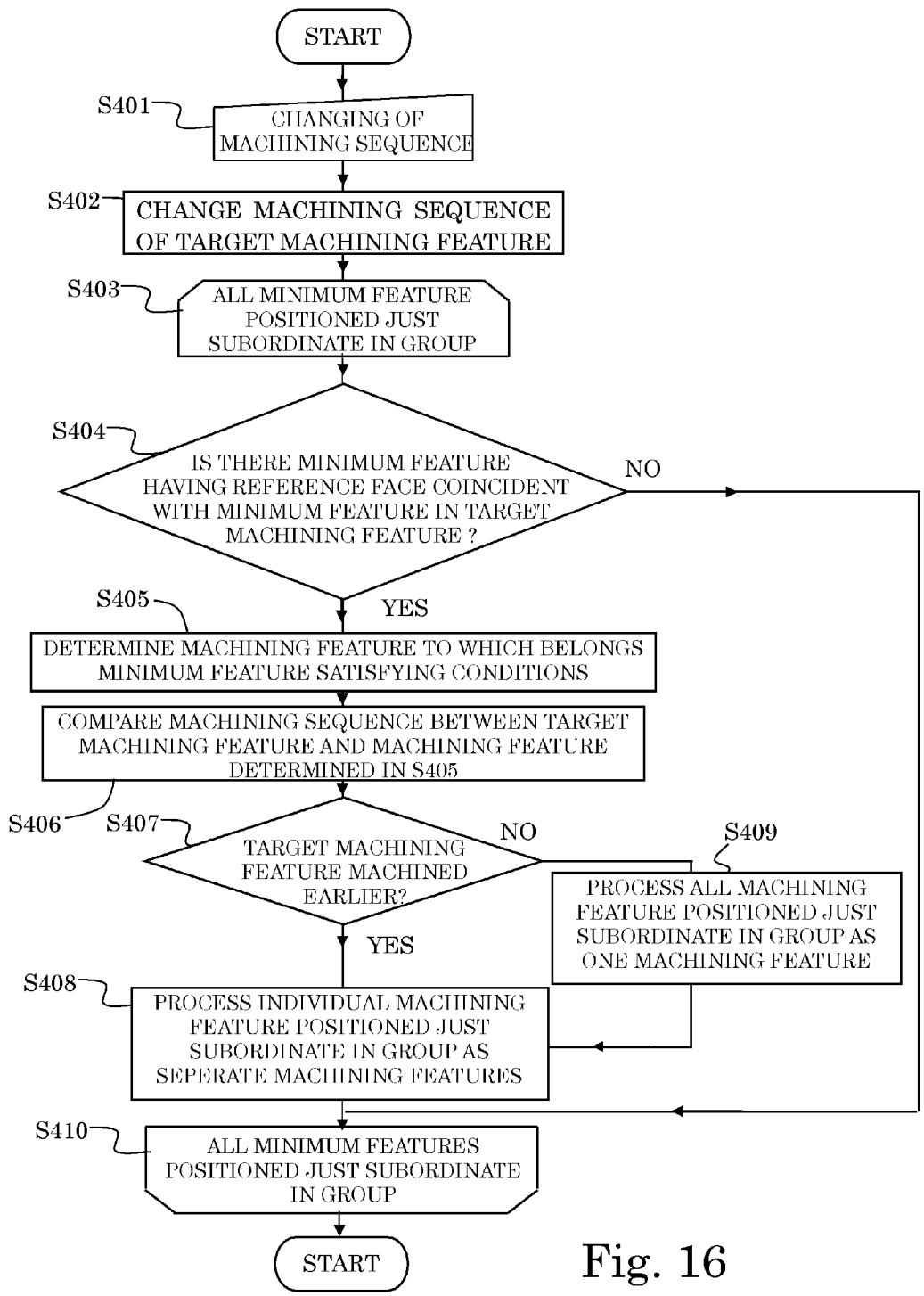
FIG. 16 is an operation flowchart of a machining procedure control section according to first embodiment of the present invention when a machining sequence is changed.

FIG. 16 is an operation flowchart of the machining procedure control section when the machining procedure is changed. When the user changes the processing sequence of the machining feature (Feat-4) (S401), the machining sequence of the target machining feature (Feat-4) is changed (S402). Then, the machining feature which is possibly affected by the sequence change is searched for, and the machining feature unit is changed based on comparison of the machining sequence. The step of searching for the possibly-affected machining feature is performed by searching all the groups other than the group to which belongs the machining feature (Feat-4) subjected to the change of the machining sequence, and by referring to the reference faces of all the minimum features which are positioned just subordinate in the groups (i.e., at the uppermost level in the machining feature). If there is a minimum feature having a reference face coincident with the minimum feature in the target machining feature (Feat-4) (S404), the group to which belongs the relevant minimum feature is the machining feature group which is affected by the change. The machining sequence is compared (S406) between the machining feature (Feat-4) subjected to the change of the machining sequence and a machining feature (Feat-5) to which belongs the searched minimum feature. If (Feat-4) is machined earlier, individual machining features positioned just subordinate in the group to which belongs (Feat-5) are each handled as one machining feature (S408). If (Feat-4) is machined later, all machining features positioned just subordinate in the group to which belongs (Feat-5) are handled as one machining feature (S409). For example, when the machining sequence of the machining feature in Group-3: face (S11) in FIG. 14 is changed, Group-1 becomes the affected machining feature group because Group-1: face (F12) has the face (S11) as its reference face. In that case, if the machining feature of the face (S11) is machined earlier, the machining feature to which belongs the face (F13) and the machining feature to which belongs the face (F12) are handled as individual machining features. If the face (S11) is machined later, the machining feature to which belongs the face F13) and the machining feature to which belongs the face F12) are handled as one machining feature.

While the embodiment has been described above, by way of example, in connection with the case where the machining shape is a hole, the present invention is similarly applied to the case where other machining shape, such as a pocket or a slot, is divided.

Other Embodiments

[Method of Deciding Machining Sequence with Calculation of Machining Time]

In the first embodiment described above, when the user changes the machining sequence of the machining feature, the machining feature suitable for the changed machining procedure is used. However, when there are different machining features suitably used depending on the changed machining procedure, the processing can also be performed through the steps of comparing respective machining times required for the different machining procedures and machining features, and selecting the machining procedure and the machining feature which provide the shortest machining time. While the machining time can be of course calculated in comparison with the overall machining time of an entire workpiece, it can also be calculated for only those among all the machining procedures, which are related to the relevant machining procedure, except for the irrelevant ones.

[Explicit Display as to Whether Machining Posture of Machining Feature can be Changed]

Figure 17:
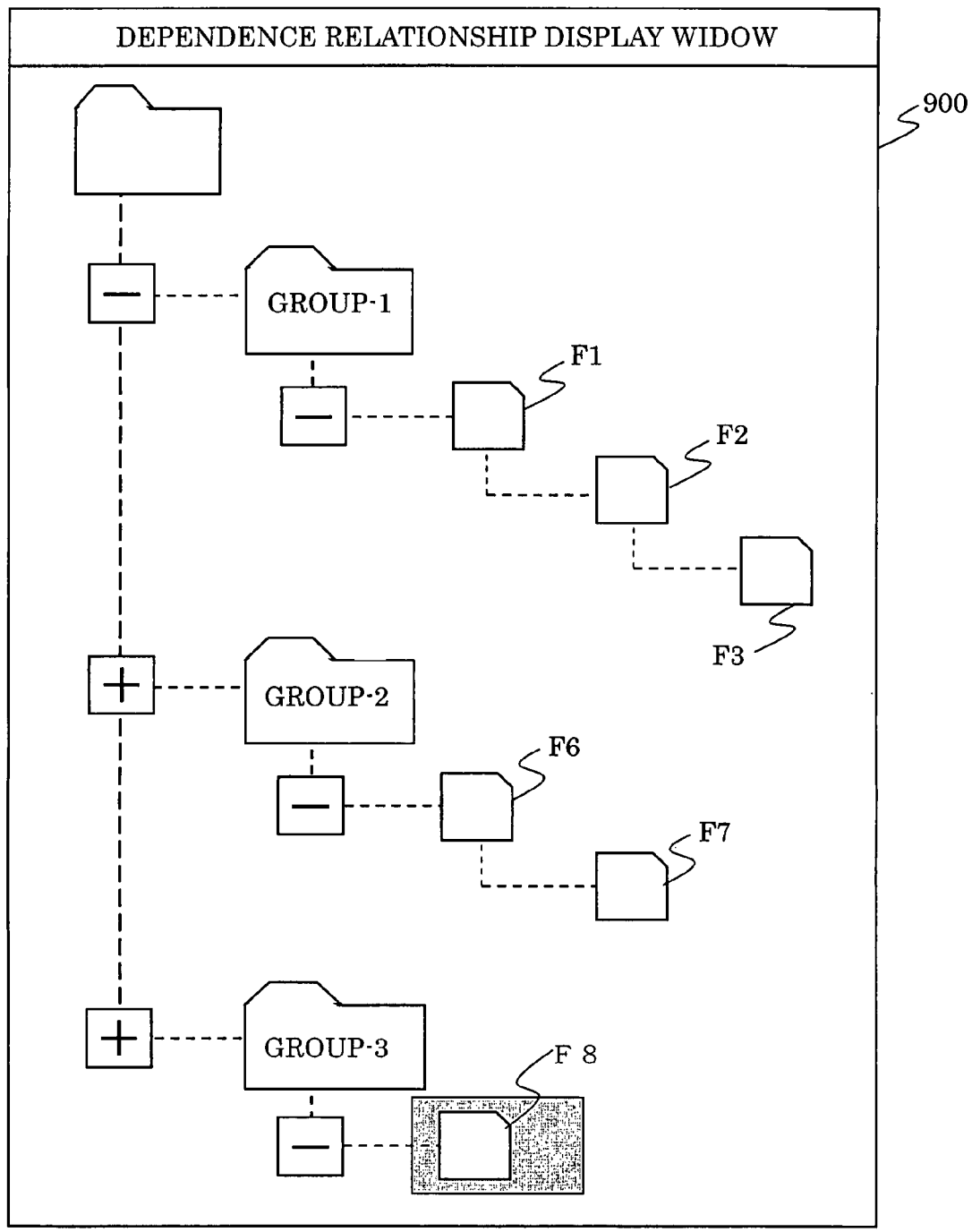
FIG. 17 is an explanatory view for explaining explicit display given according to another embodiment of the present invention as to whether the machining posture of a machining feature can be changed.
Figure 18:
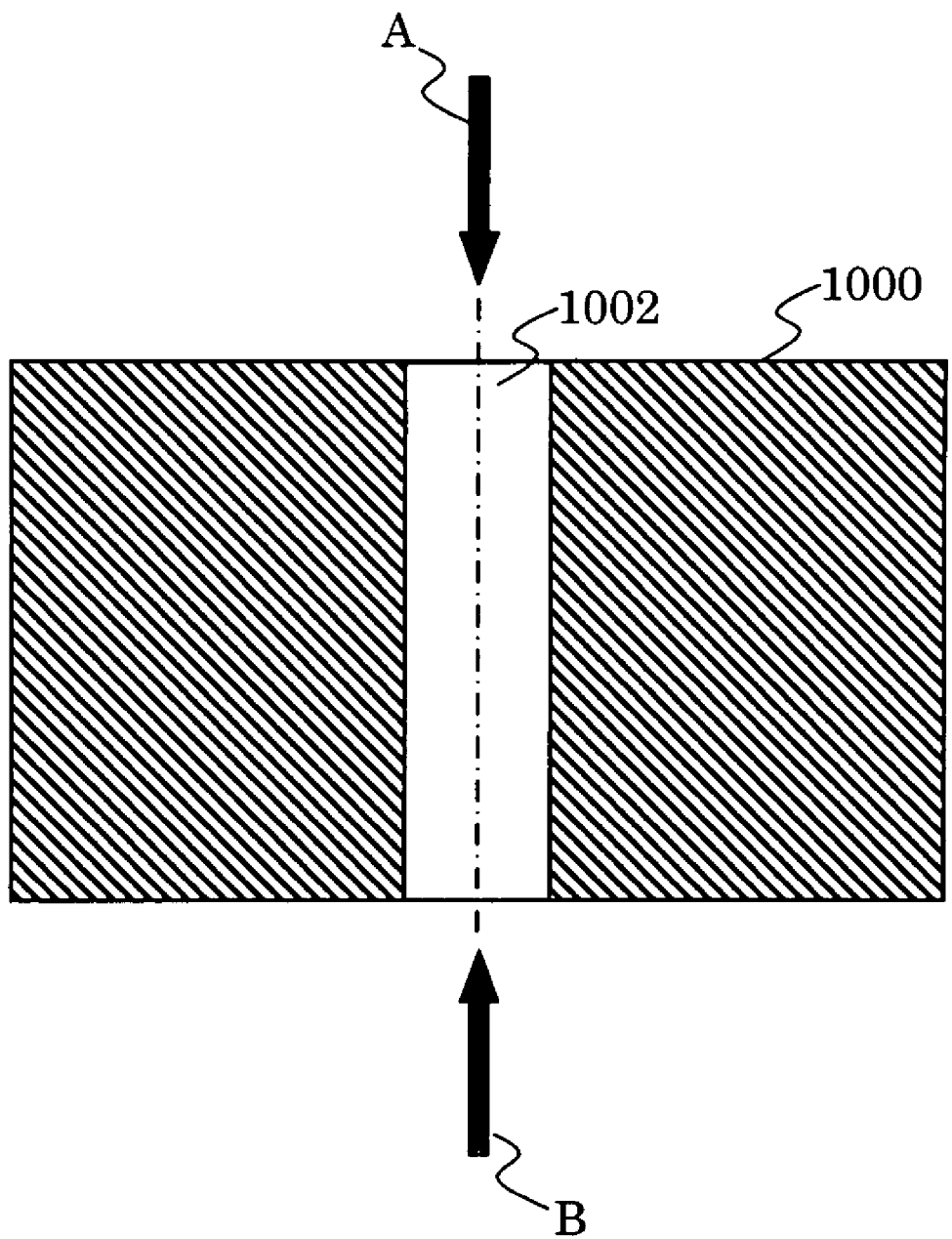
FIG. 18 shows a shape in which a machining posture is not uniquely decided.
Figure 19A:
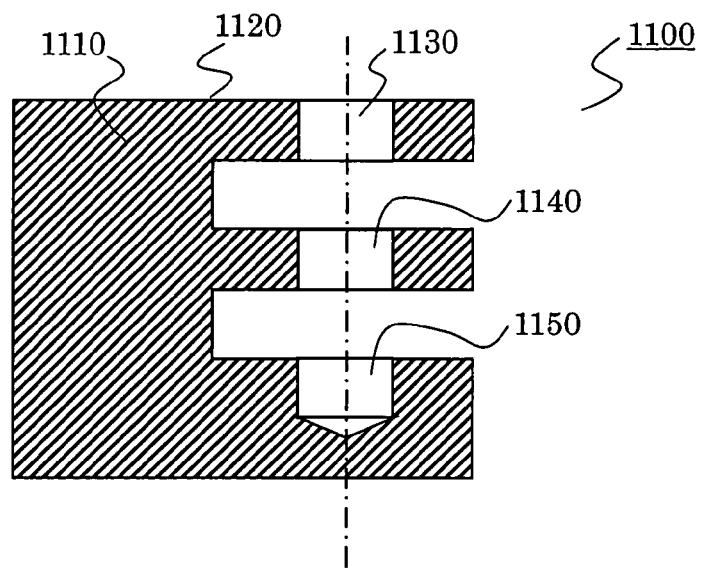
Figure 19B:
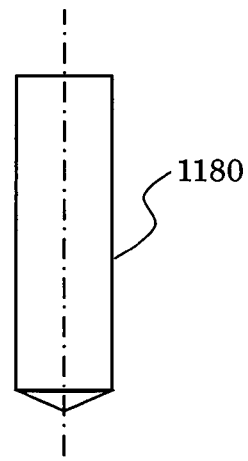

It is desired to present explicit display of the machining feature of which machining posture can be changed and/or the machining feature of which machining posture cannot be changed. As one example of the explicit display, the machining feature table of FIG. 13 is displayed on a display screen in the form of a tree resembling the table (attribute information may be not displayed), as shown in FIG. 17, and the changeable machining feature is explicitly displayed by painting out it with a color differing from the background color. In such explicit display, an icon representing the relevant machining feature is also displayed together with the name of the machining feature. Since tree view control is already well known and is a conventional technique in the art, a further description thereof is omitted here.

What is claimed is:

1. A computer aided manufacturing system for converting design data designed by a computer aided design apparatus to manufacturing data used in a working machine for machining a workpiece, the computer aided manufacturing system comprising a processor to:
load the design data;
extract geometrical shapes and attribute information of features based on the loaded design data, the features being one of hole elements included in one of machining features, the attribute information including at least information which indicates whether each of opening directions of the geometrical shapes is reversible or not;
obtain dependence relationships among the features from the extracted geometrical shapes and attribute information of the features;
obtain each of the machining features into which the features corresponding to each of the machining features are integrated based on the dependence relationships among the features; and
obtain each of machining procedures corresponding to the integrated machining features,
wherein the design data is converted to the manufacturing data in accordance with each of the obtained machining procedures, the manufacturing data being used for machining the workpiece.

2. The computer aided manufacturing system according to claim 1, wherein the processor obtains each the machining procedures, each of the machining procedures being related to corresponding to respective each of the integrated machining features,
calculates, when a machining area is overlapped between the integrated machining features, respective machining times according to the integrated machining features and the machining procedures, and
converts the design data to the manufacturing data for one of the integrated machining features and corresponding one of the machining procedures, the one of the integrated machining features and the corresponding one of the machining procedures are selected according to the calculated machining times.

3. A computer aided manufacturing system for converting design data designed by a computer aided design apparatus to manufacturing data used in a working machine for machining a workpiece, the computer aided manufacturing system comprising a processor to:
load the design data;
extract geometrical shapes and attribute information of a features based on the loaded design data, the features being one of hole elements included in one of machining features, the attribute information including at least information which indicates whether each of opening directions of the geometrical shapes is reversible or not;
obtain dependence relationships among the features from the extracted geometrical shapes and attribute information of the features;
determine from the obtained dependence relationships among the features whether one feature is divided by another feature;
determine, when a determination result in that one feature is divided by another feature, whether a divided feature is machined earlier than a dividing feature in a machining sequence; and
generate, when a determination result in that the divided feature is machined earlier than the dividing feature in the machining sequence, the manufacturing data for the feature before the divided feature is divided, the manufacturing data for machining the workpiece.

4. A computer aided manufacturing system for converting design data designed by a computer aided design apparatus to manufacturing data used in a working machine for machining a workpiece, the computer aided manufacturing system comprising a processor to:
load the design data;
extract geometrical shapes and attribute information of a features based on the loaded design data, the features being one of hole elements included in one of machining features, the attribute information including at least information which indicates whether opening directions of the geometrical shapes is reversible or not;

obtain dependence relationships among the features from the extracted geometrical shapes and attribute information of the features;

determine from the extracted attribute information of the features whether a machining posture is available to be changed, a change of the machining posture being based on data according to an instruction entered by a user, the machining posture being indicative of a posture of the workpiece to be machine; and display, in a user viewable manner, information indicative of the dependence relationship and of whether the machining posture is available to be changed or not.

5. A manufacturing data generating method executed by a computer for converting design data designed by a computer aided design apparatus to manufacturing data used in a working machine for machining a workpiece, the method comprising:

loading the design data by the computer;

extracting geometrical shapes and attribute information of features based on the loaded design data, the features being one of a hole elements included in one of machining features, the attribute information including at least information which indicates whether each of opening directions of the geometrical shapes is reversible or not;

obtaining dependence relationships among the features from the extracted geometrical shapes and the extracted attribute information of the features;

determining from the obtained dependence relationships among the features whether one feature is divided by another feature;

determining whether a plurality of features are machined earlier than one feature in a machining sequence, when the one feature is divided into the plurality of features; and generating the manufacturing data for the feature before the one feature is divided, when the plurality of features are machined earlier than the one feature in the machining sequence.

6. A computer aided manufacturing system for converting design data designed by a computer aided design apparatus to manufacturing data used in a working machine for machining a workpiece, the computer aided manufacturing system comprising a processor to:

load the design data;

extract attribute information of features based on the loaded design data, the features being one of hole elements included in one of machining features, the attribute information including at least information which indicates whether each of opening directions of the geometrical shapes is reversible or not;

determine from the extracted attribute information of the features whether a machining posture is available to be changed, a change of the machining posture being based on data according to an instruction entered by a user, the machining posture being indicative of a posture of the workpiece; and display, in a user viewable manner, information indicative of that the change of the machining posture is not permitted.

7. A manufacturing data generating method executed by a computer for converting design data designed by a computer aided design apparatus to manufacturing data used in a working machine for machining a workpiece, the method comprising:

loading the design data by the computer;

extracting geometrical shapes and attribute information of features based on the loaded design data, the features being one of hole elements included in one of machining features, the attribute information including at least information which indicates whether one of opening directions of the geometrical shapes is reversible or not;

obtaining dependence relationships among the features from the extracted geometrical shapes and attribute information of the features;

determining from the obtained dependence relationships among the features whether one feature is divided by another feature;

determining whether the one feature is machined later than the another feature in a machining sequence, when based on the obtained dependence relationships among the features a determination result in that one feature is divided by another feature; and generating the manufacturing data for the divided feature, when the determination results in that the divided feature is machined later than the dividing feature in the machining sequence.

8. A manufacturing data generating method executed by a computer for converting design data designed by a computer aided design apparatus to manufacturing data used in a working machine for machining a workpiece, the method comprising:

loading the design data by the computer;

extracting geometrical shapes and attribute information of features based on the loaded design data, the features being one of hole elements included in one of machining features, the attribute information including at least information which indicates whether each of opening directions of the geometrical shapes is reversible or not;

obtaining dependence relationships among the features from the extracted geometrical shapes and attribute information of the features;

determining from the extracted attribute information of the machining features whether a machining posture is available to be changed;

displaying in a user viewable manner the dependence relationships among the features and a situation as to whether the machining posture is available to be changed; and updating automatically the attribute information of one or more features affected by a change of the machining posture, when an instruction of a change of a changeable machining posture is received from a user through input device.

9. The computer aided manufacturing system according to one of claims 1, 3, 4 and 6, wherein the opening direction is obtained by a process, performed by the processor, in which
exterior loops of an exterior shape of the hole element are determined, a plurality of faces are determined, each of the plurality of the faces sharing one of the exterior loops with a face of one of the hole elements, and one of the opening directions corresponding to one of the geometrical shapes is determined based on a relationship between one of the plurality of the faces and the one of the exterior loops, the one of the exterior loops being shared with the face of the hole element, or a relationship between one of the plurality of the faces and the face of the hole element.

10. The manufacturing data generating method according to one of claims 5, 7 and 8, wherein one of the opening directions is obtained by a process in which exterior loops constituting an exterior shape of one of the hole elements are determined, a plurality of faces are determined, each of the plurality of the faces sharing one of the exterior loops with a face of the one of the hole elements, and one of the opening directions corresponding to one of the geometrical shapes is determined based on a relationship between one of the plurality of the faces and the one of the exterior loops, the one of the exterior loops being shared with the face of the hole element, or a relationship between one of the plurality of the faces and the face of the one of the hole elements.

* * * * *

UNITED STATES PATENT AND TRADEMARK OFFICE
CERTIFICATE OF CORRECTION

PATENT NO. : 8,255,076 B2  
APPLICATION NO. : 11/824023  
DATED : August 28, 2012  
INVENTOR(S) : Masahito Nasu Page 1 of 1

It is certified that error appears in the above-identified patent and that said Letters Patent is hereby corrected as shown below:

On the Title Page:

Under item (74) Attorney, Agent or Firm, delete "Greers" and insert --Greer--.

In the Claims:

Col. 14, line 18, delete "each the" and insert --each of the--.

Col. 14, line 38, delete "a".

Col. 14, line 65, delete "a".

Col. 15, line 12, delete "machine" and insert --machined--.

Col. 15, line 61, delete "of that" and insert --that--.

Signed and Sealed this
Eighteenth Day of February, 2014

Michelle K. Lee
*Deputy Director of the United States Patent and Trademark Office*